United States Patent
Wilson et al.

(10) Patent No.: US 10,611,626 B2
(45) Date of Patent: Apr. 7, 2020

(54) PINCH VALVE FOR LIQUID DISPENSER

(71) Applicant: A.C. DISPENSING EQUIPMENT INC., Lower Sackville (CA)

(72) Inventors: Avery Wilson, Annapolis Royal (CA); Brian Gay, Enfield (CA); Derek Cole, Lower Sackville (CA); Jeffrey Tofflemire, Head of Chezzetcook (CA); Ian Maclean, Fall River (CA)

(73) Assignee: A.C. Dispensing Equipment Inc., Lower Sackville (CA)

( * ) Notice: Subject to any disclaimer, the term of this patent is extended or adjusted under 35 U.S.C. 154(b) by 250 days.

(21) Appl. No.: 14/928,523

(22) Filed: Oct. 30, 2015

(65) Prior Publication Data

US 2017/0122444 A1    May 4, 2017

(51) Int. Cl.
| | |
|---|---|
| *B67D 3/04* | (2006.01) |
| *F16K 7/04* | (2006.01) |
| *B67D 7/36* | (2010.01) |
| *B65D 83/00* | (2006.01) |
| *F25D 23/00* | (2006.01) |

(52) U.S. Cl.
CPC .............. *B67D 7/36* (2013.01); *B65D 83/00* (2013.01); *B67D 3/041* (2013.01); *F16K 7/045* (2013.01); *F25D 23/00* (2013.01)

(58) Field of Classification Search
CPC .. F16K 7/04; F16K 7/045; B67D 3/04; B67D 3/041; B67D 7/36; B65D 83/00; B65D 45/32; F25D 23/00
USPC .......................................... 251/7, 8; 222/214
See application file for complete search history.

(56) References Cited

U.S. PATENT DOCUMENTS

| | | | | |
|---|---|---|---|---|
| 3,982,724 A | * | 9/1976 | Citrin ........................ | F16K 7/06 222/43 |
| 4,372,304 A | * | 2/1983 | Avakian ............ | A61M 5/16813 137/486 |
| 4,386,919 A | * | 6/1983 | Kadono .................... | F16L 1/24 285/419 |
| 5,188,334 A | * | 2/1993 | Yoshii ..................... | F16K 7/045 137/316 |

(Continued)

FOREIGN PATENT DOCUMENTS

EP          2236873 A1    10/2010

OTHER PUBLICATIONS

Canadian Application No. 2,910,818, Office Action dated May 4, 2016.

(Continued)

*Primary Examiner* — Kevin F Murphy
*Assistant Examiner* — Jonathan J Waddy
(74) *Attorney, Agent, or Firm* — Borden Ladner Gervais LLP; Louis B. Allard

(57) ABSTRACT

A pinch valve that includes a holder and an insert that fits in the holder. The pinch valve receives a dispensing tube for liquids and controls the flow of liquid in the dispensing valve. The insert defines an inner wall portion against which a plunger assembly pushes the dispensing tube to stop liquid from flowing through the dispensing tube. The insert and the holder define a throttle portion that throttles the flow of liquid when the plunger assembly is moved from the pinch position, where is pushed the dispensing tube against the inner wall portion of the insert, to a flow position.

16 Claims, 29 Drawing Sheets

(56) References Cited

U.S. PATENT DOCUMENTS

| | | | | |
|---|---|---|---|---|
| 5,190,071 | A | * | 3/1993 | Sule .................. F16K 7/045 |
| | | | | 137/554 |
| 5,249,706 | A | * | 10/1993 | Szabo ................ B67D 1/0869 |
| | | | | 165/80.3 |
| 6,482,190 | B1 | * | 11/2002 | Genese ................ A61F 5/4405 |
| | | | | 222/103 |
| 7,104,275 | B2 | | 9/2006 | Dille |
| 8,376,310 | B2 | | 2/2013 | Veltrop et al. |
| 8,979,070 | B2 | | 3/2015 | Keizer et al. |
| 2004/0144800 | A1 | * | 7/2004 | Danby ................ B65D 77/30 |
| | | | | 222/105 |
| 2006/0037353 | A1 | * | 2/2006 | Smestad .............. B67D 3/0009 |
| | | | | 62/389 |
| 2012/0261538 | A1 | * | 10/2012 | Keizer ................ F16K 7/04 |
| | | | | 248/313 |
| 2012/0318824 | A1 | * | 12/2012 | McKenna ........... B65D 77/067 |
| | | | | 222/185.1 |
| 2012/0325859 | A1 | | 12/2012 | Malin et al. |
| 2012/0325860 | A1 | | 12/2012 | Veltrop et al. |
| 2012/0326061 | A1 | | 12/2012 | Veltrop et al. |
| 2013/0119284 | A1 | * | 5/2013 | Fukano ................ F16K 7/045 |
| | | | | 251/7 |
| 2015/0107696 | A1 | | 4/2015 | Keizer et al. |

OTHER PUBLICATIONS

Canadian Office Action for Canadian Patent Application No. 2,910,818, dated Aug. 9, 2016.

International Patent Application No. PCT/CA2016/051234, International Search Report and Written opinion dated Dec. 28, 2016.

* cited by examiner

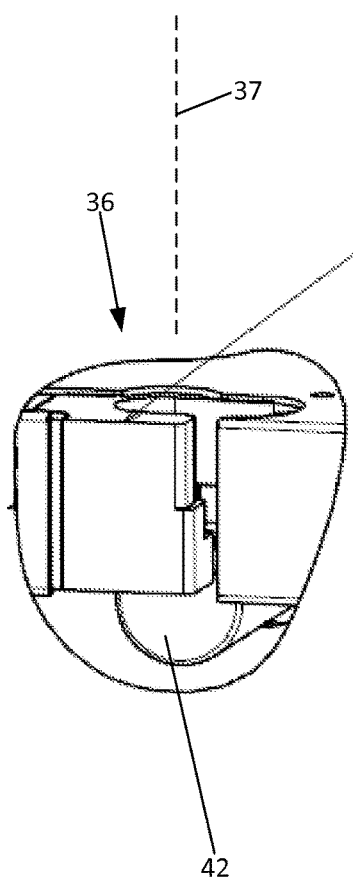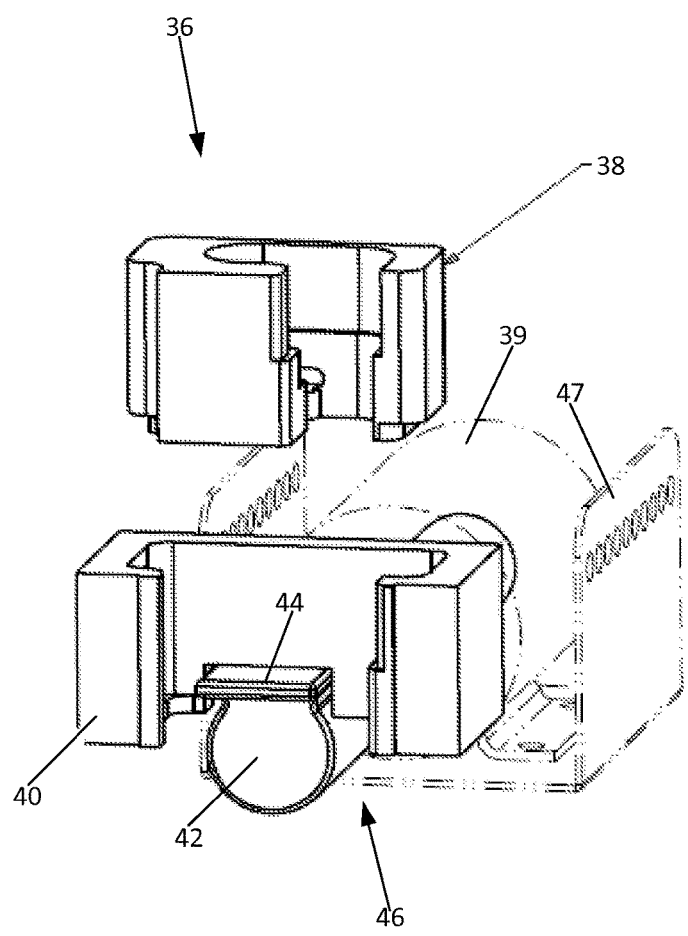
FIG. 2A
FIG. 2B

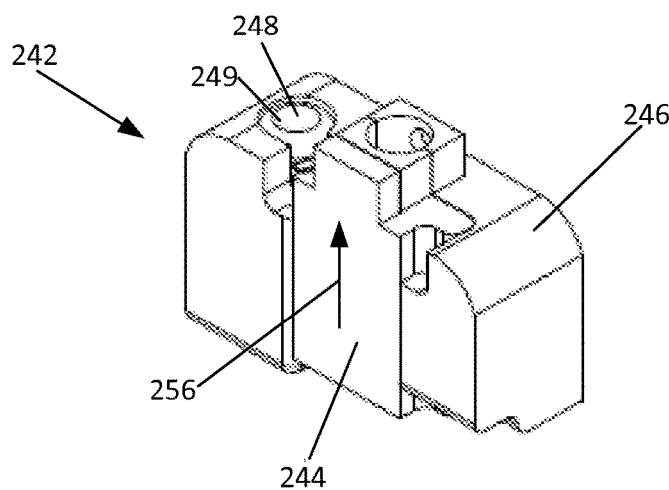
FIG. 17
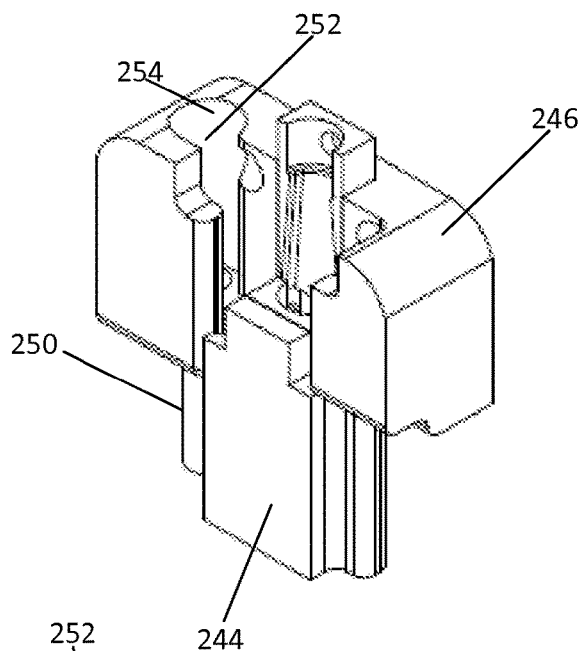
FIG. 18
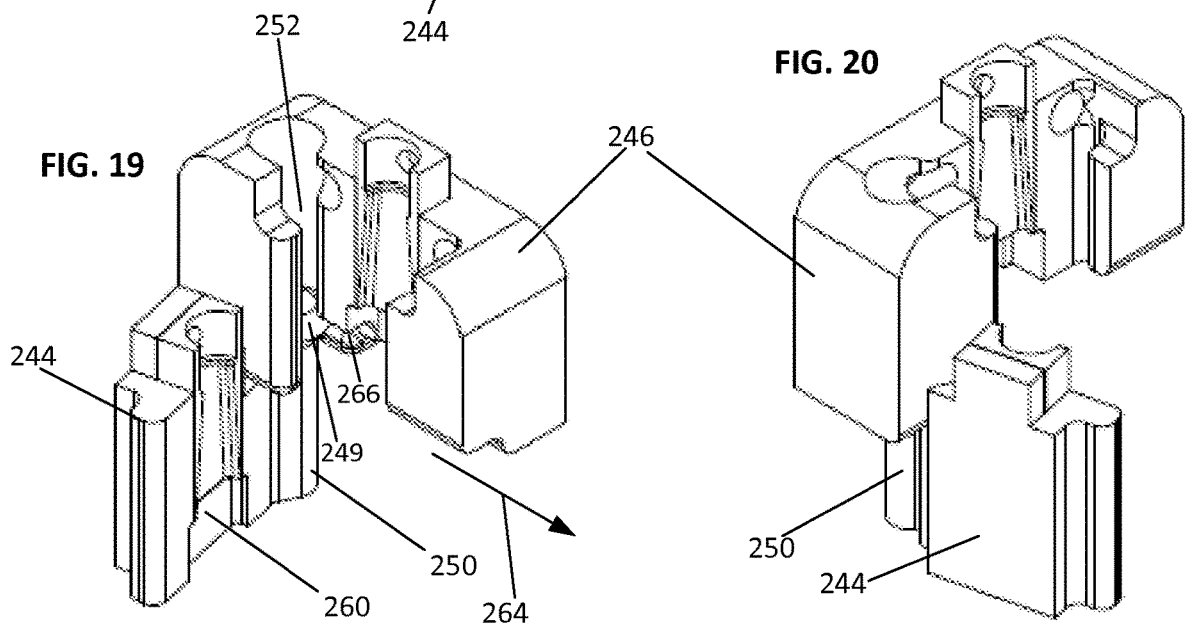
FIG. 19
FIG. 20

PINCH VALVE FOR LIQUID DISPENSER

FIELD

The present disclosure relates generally to pinch valves. More particularly, the present disclosure relates to pinch valves used in liquid dispensers.

BACKGROUND

Cleaning existing liquid dispenser pinch valves often requires that the entire assembly of the pinch valve be taken apart, using tools to remove fasteners, prior to cleaning. This requires time, tools, training, and tracking of the fasteners so they do not get lost. As such, the liquid dispensers can experience considerable downtime, which can result, for example, in coffee shops, in customers desiring cream dispensed in their coffee, to wait longer than necessary.

Additionally, existing pinch valves do not allow easy and quick removal/insertion of dispensing tubes when removing a spent liquid container from a liquid dispensing machine and installing a replacement liquid container.

Further, existing pinch valves often lack suitable control of the volume of liquid being dispensed.

Therefore, improvements in pinch valves are desirable.

SUMMARY

In a first aspect, the present disclosure provides a pinch valve that comprises a holder defining a recess; and an insert shaped to fit in the recess of the holder. The insert has an inner wall portion. The insert and the holder are structured for the insert to be moved, along an axis, from an installed position where the holder holds the insert, to a removed position, where the insert is removed from the holder. The holder and the insert are configured to receive a dispensing tube and to cooperate, when in the installed position, with a plunger assembly biased to push the dispensing tube against the inner wall portion of the insert.

In a second aspect, the present disclosure provides a pinch valve that comprises a holder defining a recess; and an insert shaped to fit in the recess of the holder. The insert has an inner wall portion. The insert and the holder are structured for the insert to be moved, along an axis, from an installed position where the holder holds the insert, to a removed position where the insert is removed from the holder. The holder and the insert are configured to receive a dispensing tube. The pinch valve also comprises a plunger movable from a pinch position where the plunger pushes the dispensing tube against the inner wall portion of the insert, to a flow position where the plunger is retracted from the inner wall portion.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 2A shows a close-up perspective view of the pinch valve of FIG. 1.

FIG. 2B shows a further perspective view of the pinch valve of FIG. 1, with an insert of the pinch valve in a removed position, outside a holder of the pinch valve.

FIG. 17 show a top, front perspective view of yet another embodiment of a pinch valve of the present disclosure.

FIG. 18 shows the pinch valve assembly of FIG. 17, with the insert in an intermediary position.

FIG. 19 shows the pinch valve assembly of FIG. 17, with the insert in an open position.

FIG. 20 shows the pinch valve assembly of FIG. 17, with the insert in an open position.

DETAILED DESCRIPTION

The present description relates to a pinch valve for dispensing liquids. The pinch valve comprises a holder and an insert that fits in the holder. The insert, the holder, or both, define an aperture in which a dispensing tube can be installed. The insert, the holder, or both, also define a throttle region along which dispensing tube is deformed and has a reduced cross-section. When the pinch valve is in an open state, the flow of liquid through the dispensing tube is reduced compared to what it would be if the pinch valve did not have a throttle region. This reduced flow of liquid, caused by the throttle region, allows for greater dispensing accuracy with respect to the volume of liquid dispensed. Further, the insert of the pinch valve of the present disclosure can be easily removed from the holder to allow for quick and easy cleaning.

Figure 1:
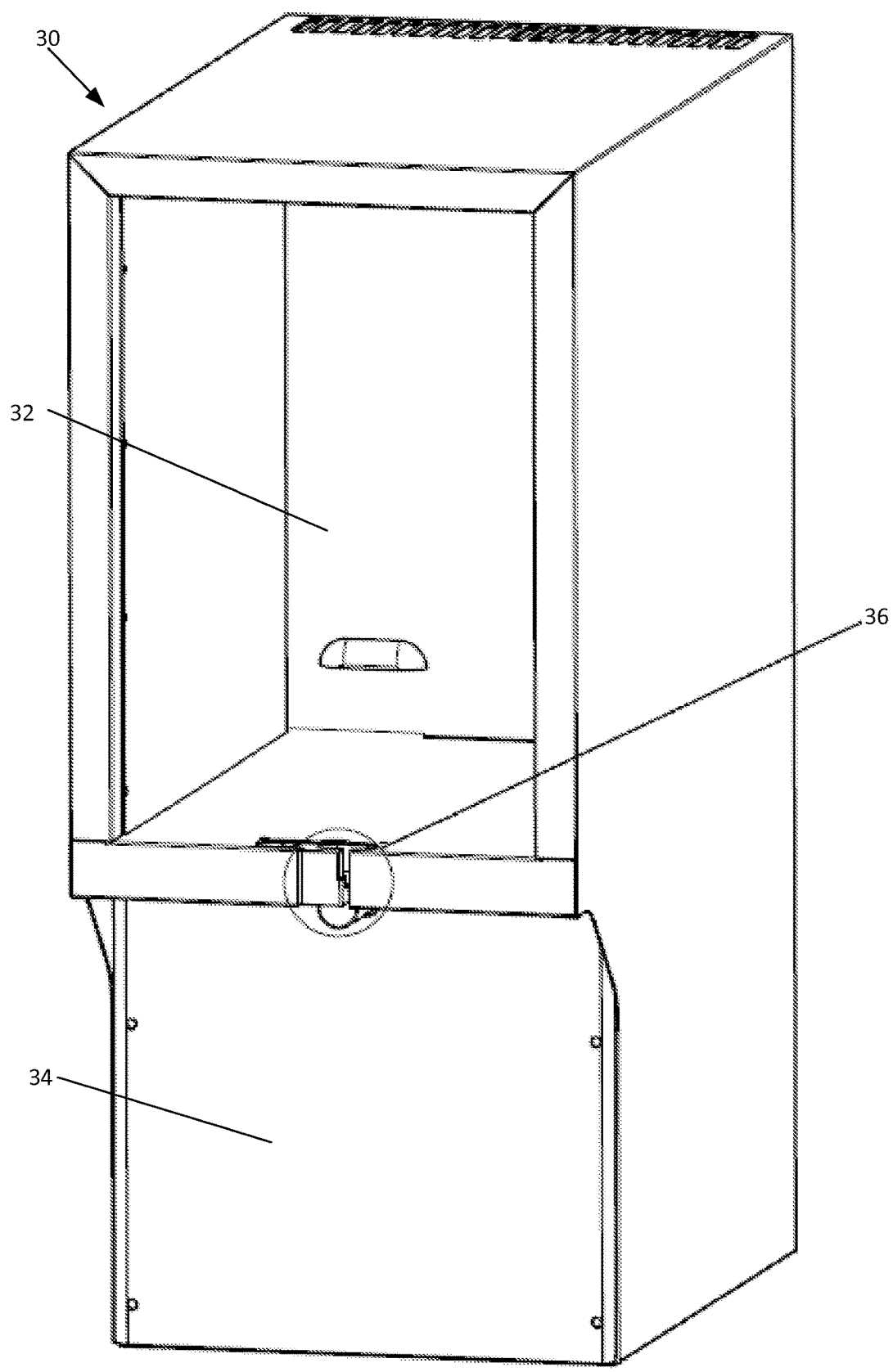
FIG. 1 shows a perspective view of a liquid dispensing machine fitted with an embodiment of a pinch valve in accordance with the present disclosure.

FIG. 1 shows a perspective view of a liquid dispensing machine 30 having a refrigerated area 32 where a container of liquid to be dispensed (e.g., milk, cream, etc.) can be refrigerated. Also shown is a refrigeration unit compartment 34 where a compressor and condenser, used to refrigerate the refrigerated area 32, are housed. Further shown in FIG. 1 is an example of a pinch valve 36 in accordance with the present disclosure.

FIG. 2A shows a close-up perspective view of the pinch valve 36 where an insert 38 is shown in an installed position where the insert 38 is installed in a holder (not shown). An axis 37 is also shown. As described further below, the insert 38 can be moved along the direction defined by the axis 37 in order to remove the insert 38 from the holder. FIG. 2A also shows a part of a plunger 42, which will be described in detail further below.

FIG. 2B shows a further perspective view of the pinch valve 36 where the insert 38 is shown, in a removed position, outside the holder 40. FIG. 2B further shows the plunger 42, the tip 44 of which is for pushing a dispensing tube (not shown), installed in the pinch valve 36, against an inner wall of the insert 38. The plunger 42 is part of a plunger assembly 46 that, in this embodiment, is a solenoid activated plunger assembly (a solenoid unit 39 is shown mounted to a bracket 47). Other types of plunger assembly can be used such as, for example, a manually activated plunger assembly, stepper motor plunger assembly, or any other suitable electromechanical plunger assembly.

The holder 40 can be secured to the liquid dispensing machine 30 through any suitable means such as, but not limited to, fasteners (bolts, nuts, screws, etc.).

Figure 3A:
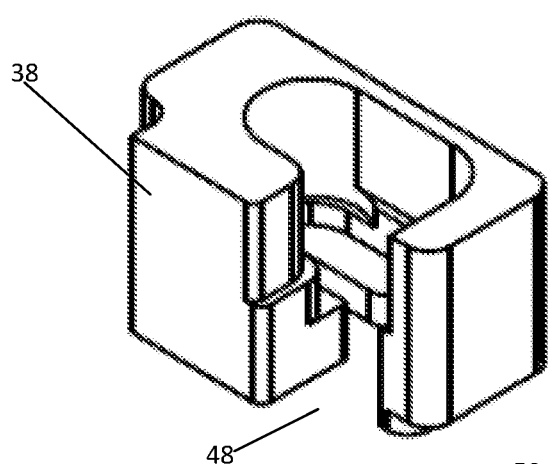
FIG. 3A shows a top front perspective view of the insert shown at FIG. 2B.

FIG. 3A shows a front perspective view of the insert 38. The insert 38 defines a front opening 48, which, in collaboration with an opening defined in the holder 40 (the opening defined by the holder 40 is described below), allows for a dispensing tube (not shown) to be easily installed in the pinch valve 36, and removed from the pinch valve 36, without requiring the dispensing tube to be unduly bent.

Figure 3B:
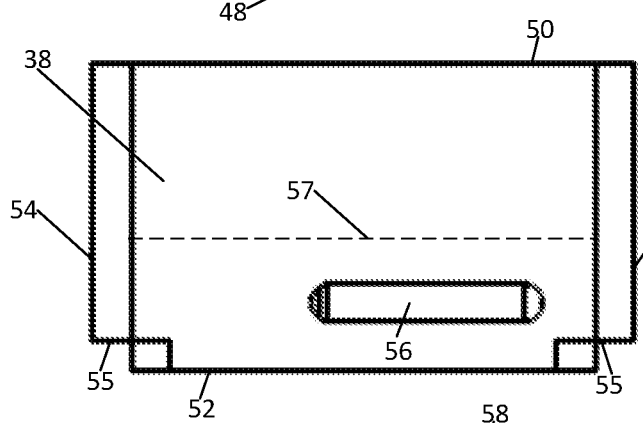
FIG. 3B shows a back view of the insert shown at FIG. 3A.

FIG. 3B shows a back elevation view of the insert 38, which has a top 50, a bottom 52, sidewalls 54, and a window 56. The window 56 defined by the insert 38 is to allow through, when the insert 38 is in the installed position, the tip 44 of the plunger 42. The insert 38 also defines a recessed bottom perimeter region 55 that allows the insert 38 to be held in the holder 40, when the insert 38 is in the installed position.

Figure 3C:
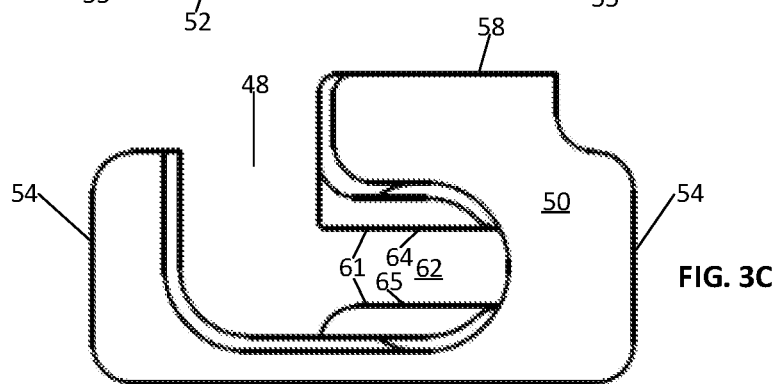
FIG. 3C shows a top view of the insert shown at FIG. 3A.

FIG. 3C shows a top view of the insert 38. The front 58, the back 60, the sidewalls 54, and the opening 48 are shown in FIG. 3C. Further, FIG. 3C identifies where, along the back 60, the window 56 is located. To install a dispensing tube in the insert 38, the dispensing tube is placed at the opening 48 from where it is moved to the position identified at reference numeral 62. Once at position 62, the dispensing tube is aligned with the plunger tip 44, which can traverse the window 56 and push the dispensing tube against an inner wall portion 64 of the insert 38. The plunger 42 is configured to generate sufficient force for the plunger tip 44 pushing the dispensing tube against the inner wall 64 to cause the dispensing tube to collapse on itself and prevent liquid from flowing through the dispensing tube. In this position, the plunger 42 and plunger tip 44 can be said to be in a pinch position, from where they can move to a flow position where the plunger 42 and plunger tip 44 are retracted from the inner wall portion 64, the dispensing tube is no longer collapsed onto itself, and liquid can flow through the dispensing tube.

With reference to FIG. 3C, the inner wall portion 64 and an opposite wall portion 65 define a throttle portion 61 of the pinch valve 36. When a dispensing tube is inserted at position 62, the dispensing tube will have a circular cross-section from the top 50 of the insert down to where the inner wall portion 64 and the opposite wall portion 65 begin, which can be referred to as the throttle input section 57, shown at FIG. 3B. From the throttle input section 57 down to the bottom 52 of the insert 38, the dispensing tube will have an oval-type cross-section. The throttle portion 61 allows for greater control of the amount of fluid being dispensed through the dispensing tube. Further, the pinch valve 36 can be designed to have a throttle portion that has a width, which is the spacing between the inner wall portion 64 and the opposite wall portion 65, selected for any one of the viscosity of a specific fluid being dispensed, the material (e.g., Kryton™ or Surgical Tubing) of the dispensing tube being used, the inner diameter of the dispensing tube, the outer diameter of the dispensing tube, the thickness of the wall of the dispensing tube, or any combination thereof.

Figure 3D:
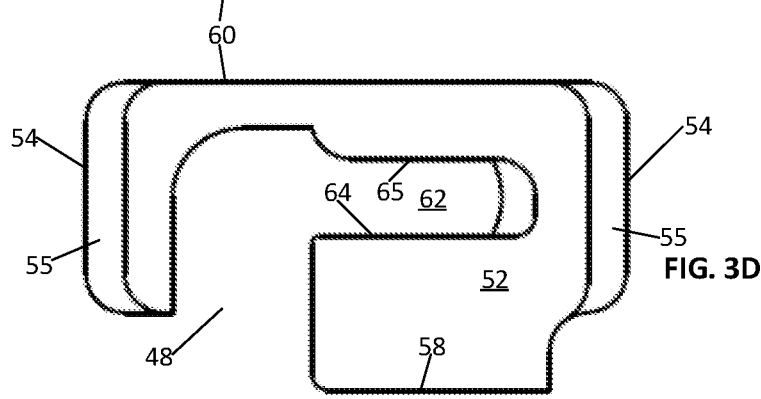
FIG. 3D shows a bottom view of the insert shown at FIG. 3A.

FIG. 3D shows a bottom view of insert 38. Shown in this figure are the sidewalls 54, the recessed bottom perimeter region 55, the front 58, the back 60, the location of the window 56, the opening 48, and the position 62.

Figure 4A:
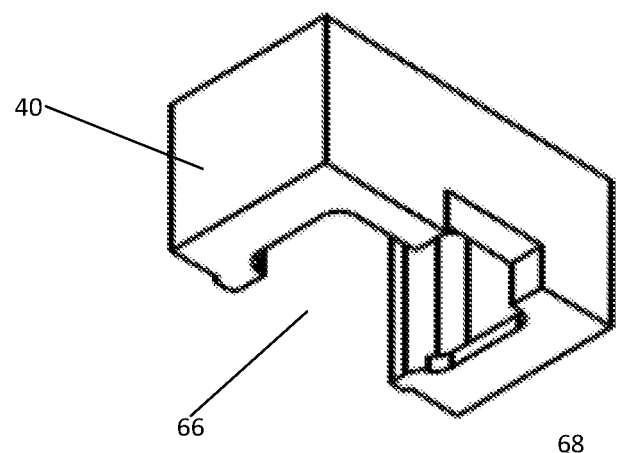
FIG. 4A shows a bottom back perspective view of the holder shown at FIG. 2B.

FIG. 4A shows a bottom perspective view of the holder 40, of the pinch valve 36 of FIG. 2A. The holder 40 defines an opening 66, which, together with the opening 48 of the insert 38, allows for a dispensing tube (not shown) to be easily installed in the pinch valve 36, and removed from the pinch valve 36, without requiring the dispensing tube to be unduly bent and without requiring that the insert 36 be removed from the holder 40.

Figure 4B:
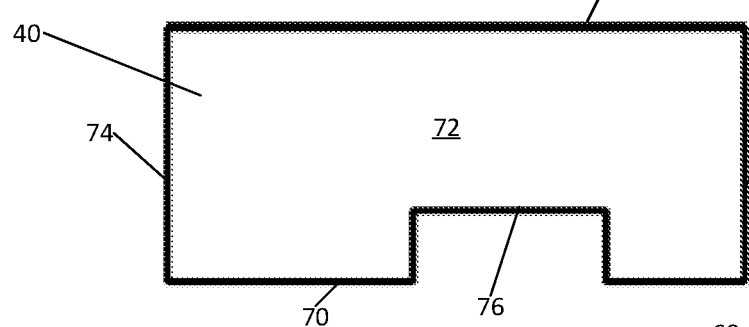
FIG. 4B shows a back view of the holder shown at FIG. 4A.

FIG. 4B shows a back view of the holder 40 where the top 68, the bottom 70, the back 72 and the sidewalls 74 are shown. Further shown is a channel 76 defined by the holder 40. The channel is configured to allow therethrough the tip 44 of the plunger 42. This is shown clearly in FIG. 2B.

Figure 4C:
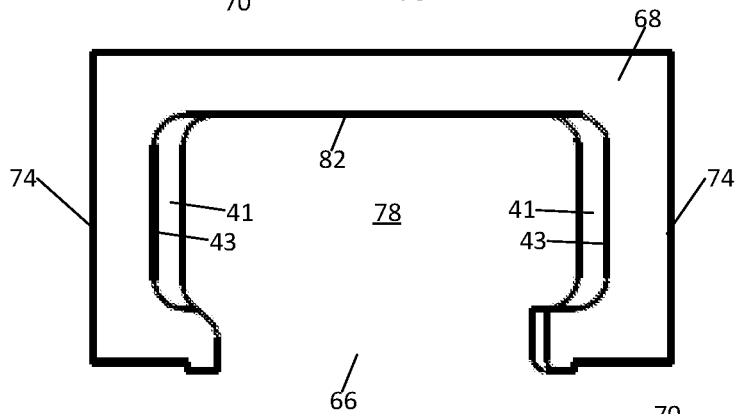
FIG. 4C shows a top view of the holder shown at FIG. 4A.

FIG. 4C shows a top view of the holder 40 where a recess 78, defined by the holder 40, is shown. FIG. 4C also shows a shelf portion 41 onto which the insert 38 is positioned when the insert 38 is in the installed position. In this position, the recessed bottom perimeter region 55 (shown at Figure B and FIG. 3D) of the insert 38 sits on the shelf portion 41. The recess 78 is located between inner sidewalls 43 and the inner back wall 82. FIG. 4C also shows the sidewalls 74 of the holder 40, the back 72, and the location of the channel 76 along the back 72.

Figure 4D:
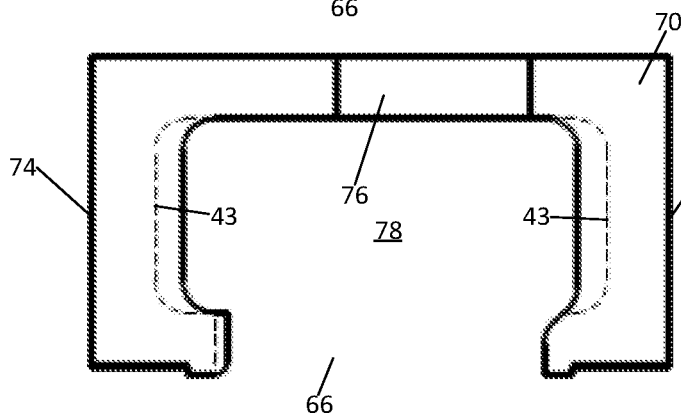
FIG. 4D shows a bottom view of the holder shown at FIG. 4A.

FIG. 4D shows a bottom view of the holder 40 where the channel 76, the opening 66, the recess 78, the bottom 70, the inner sidewalls 43 and the sidewalls 74 are shown.

Figure 4E:
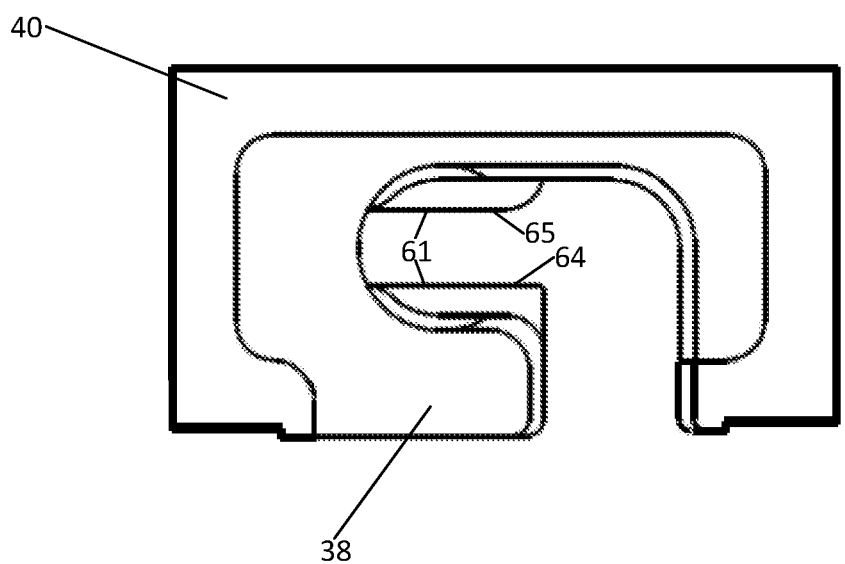
FIG. 4E shows a top view of the insert of FIG. 4A installed in the holder of FIG. 4A.

FIG. 4E shows a top view of the insert 38 in the installed position; that is, installed in the holder 40. Shown in FIG. 4E is the throttle portion 61, defined as the space between the inner wall portion 64 of the insert 38 and the opposite inner wall portion 65 of the insert 38.

When the insert 38 is in the installed position as shown at FIG. 2A, it can be moved upwardly, along the axis 37 (also shown at FIG. 2A) to a removed position where the insert is removed from the holder, as shown at FIG. 2B. The removal of insert 38 from the holder 40, i.e., moving the insert 38 from the installed position to the removed position can be done by hand, without having to use any tools. Cleaning of the insert 38 through any suitable means, for example, soap and water, can then be carried out and, once clean, the insert 38 can be put back in the holder 40. Further, as the dispensing tubing does not come in contact with the inner back wall 82 and the tapered walls 80 of the holder 40 (shown at FIG. 4C), there should be no accumulation of fluid on these surfaces, which reduces the amount of cleaning required and thereby minimizes the downtime of the liquid dispensing machine 30 of FIG. 1.

Figure 5:
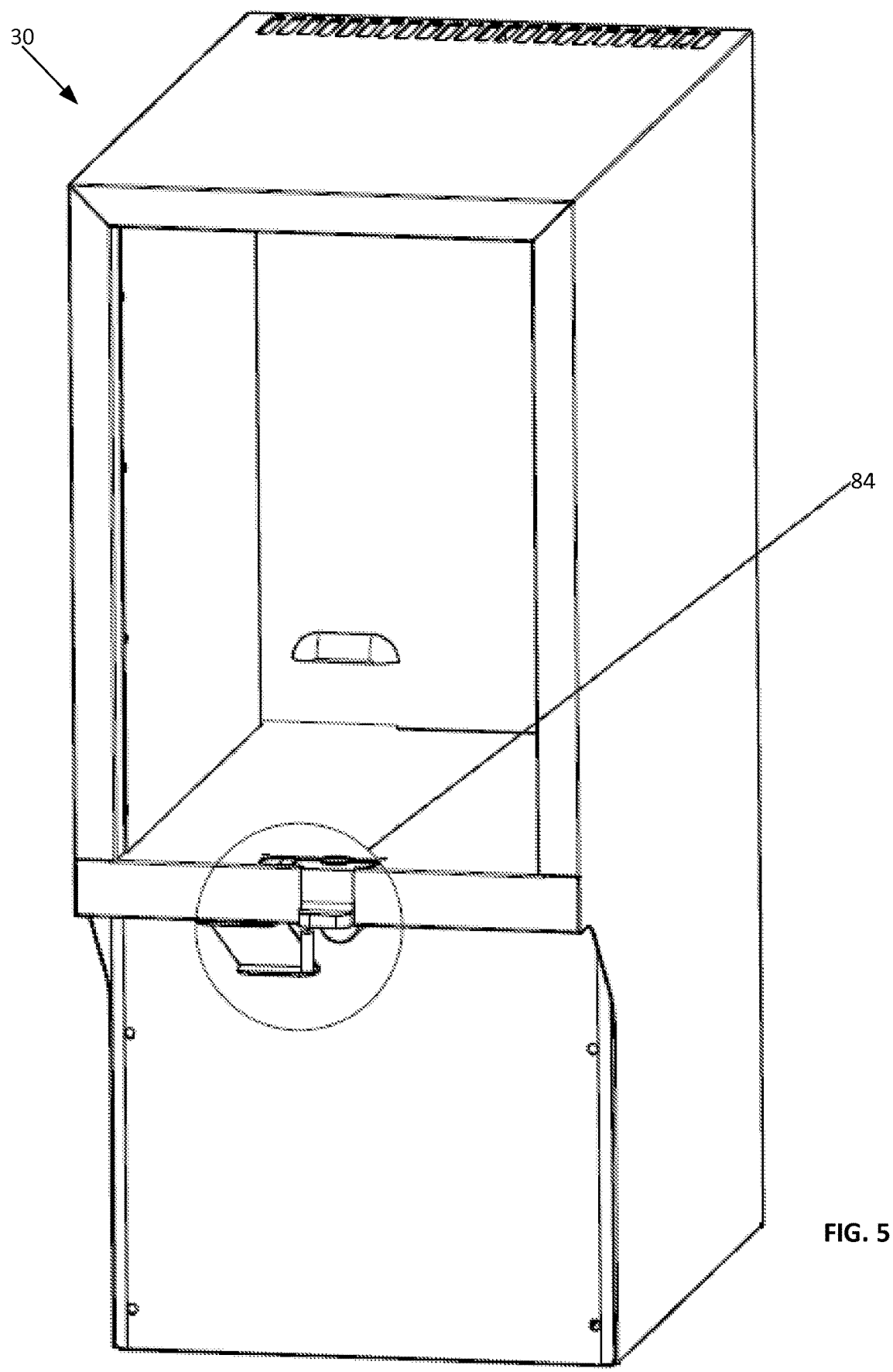
FIG. 5 shows a perspective view of a liquid dispensing machine fitted with another embodiment of a pinch valve in accordance with the present disclosure.

FIG. 5 shows perspective view of the liquid dispensing machine 30 of FIG. 1 but this time having, in another example of a pinch valve in accordance with the present disclosure, a pinch valve 84.

Figure 6A:
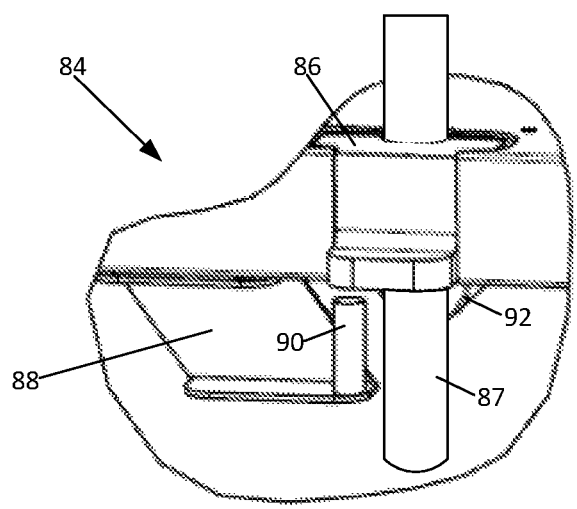
FIG. 6A shows a close-up perspective view of the pinch valve of FIG. 5.

FIG. 6A shows a close-up perspective view of the pinch valve 84 where an insert 86 is shown in an installed position where the insert 86 is installed in a holder (not shown). In this embodiment, the holder and the insert 86 are dimensioned to interfere with each other when the insert 86 is in the installed position. The insert 86 is thus held in the holder by an interference fit.

FIG. 6A also shows a dispensing tube 87 installed in the pinch valve 84, and a bracket 88 onto which the insert 86 can be pivotally mounted through complementary mating features defined by the bracket 88 and the insert 86. In this example, the bracket 88 defines (or has) a cylindrical post 90 and the insert 86 defines a cylindrical opening (not shown) that receives the cylindrical post 90 when the insert is pushed down from the installed position to an intermediary position, as will be described further below. Further shown in FIG. 6A is a portion of a plunger 92.

The pinch valve 84 can be secured to the liquid dispensing machine 30, in close proximity to where the dispensing tube 87 joins the container from which fluid is to be dispensed. As is known in the art, the storage of such containers prior to being installed in a liquid dispensing machine sometime leads to the dispensing tube being unduly bent near where the dispensing tube joins the container, which can cause a kink to be formed in that portion of the dispensing tube. Such a kink causes the dispensing tube to have a reduced cross-section in the kink region; the reduced cross-section produces a diminished liquid flow through the dispensing tube.

By securing the pinch valve 84 to the liquid dispensing machine, close to where the dispensing tube joins the container, and by installing the dispensing tube in the pinch valve, the kinked portion of the dispensing tube will be positioned, in many cases, within the pinch valve. The pinch valve will typically squeeze out the kink, thereby allowing for normal liquid flow through the dispensing tube. That is to say, the design of the pinch valve, namely the vertical length of the pinch valve and the diameter of the passageway of the pinch valve, traversed by the dispensing tube, causes the pinch valve to reform the kinked section and the dispensing tube to conform to the passageway.

Other embodiments of the present disclosure can also be secured to a liquid dispensing machine, close to where the dispensing tube 87 joins the container from which fluid is to be dispensed, in order to remove kinks from the dispensing tube.

Figure 6B:
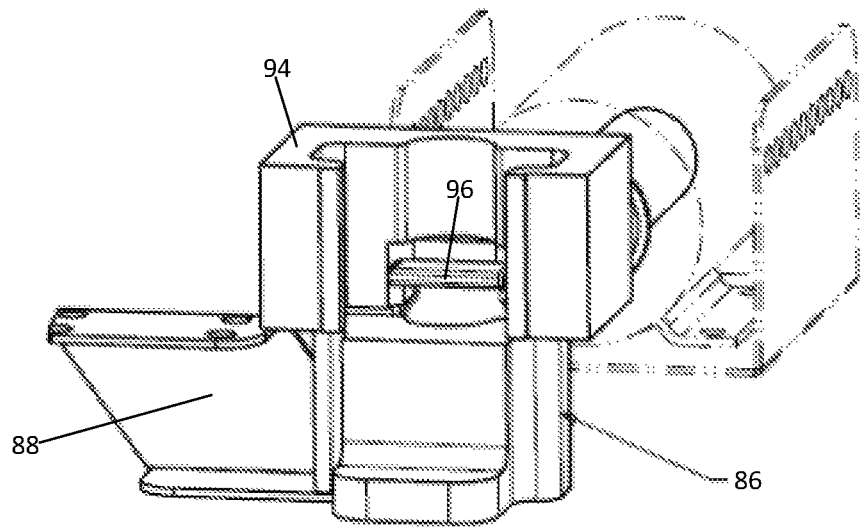
FIG. 6B shows a further perspective view of the pinch valve of FIG. 5, with an insert of the pinch valve in an intermediary position and with a holder.

FIG. 6B shows a further perspective view of the pinch valve 84 where the insert 86, the bracket 88, and a holder 94 are shown. The insert 86 is shown in the intermediary position where the insert 86 is pivotally connected to the bracket 88. Further shown in FIG. 6B is the tip 96 of the plunger 92. The tip 44 of the plunger is for pushing a dispensing tube (not shown), installed in the pinch valve 84, against an inner wall of the insert 86.

Figure 6C:
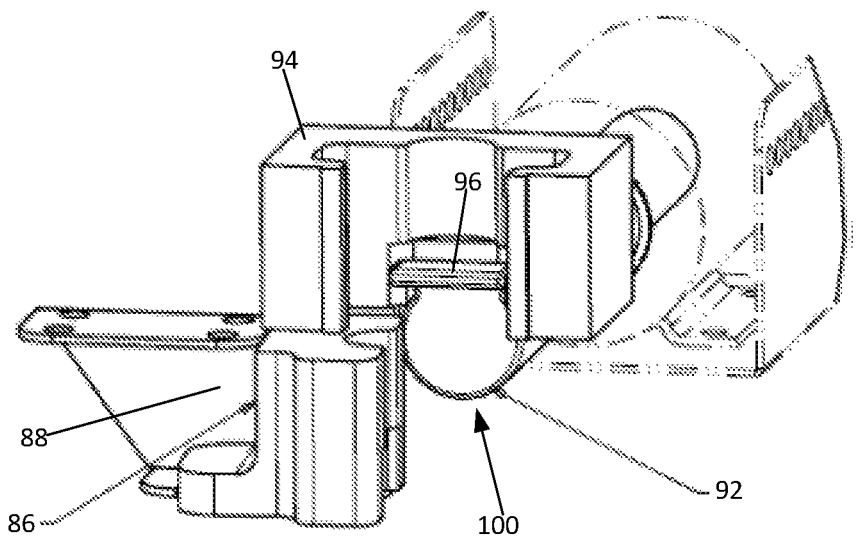
FIG. 6C shows a further perspective view of the pinch valve of FIG. 5, with an insert of the pinch valve in an open position.

FIG. 6C shows yet another perspective view of the pinch valve 84 with the insert 86 pivoted 90 degrees to an open position. Pivoting the insert 86 to the open position can facilitate the insertion of a dispensing tube (not shown) in the pinch valve 84 and can also facilitate the removal of the dispensing tube from the pinch valve 84.

FIG. 6C further shows a plunger assembly 100 that comprises the plunger 92 and the tip 96 of the plunger.

The holder 94 and the bracket 88 can be secured to the liquid dispensing machine through any suitable means such as, but not limited to, fasteners (bolts, nuts, screws, etc.)

Figure 7A:
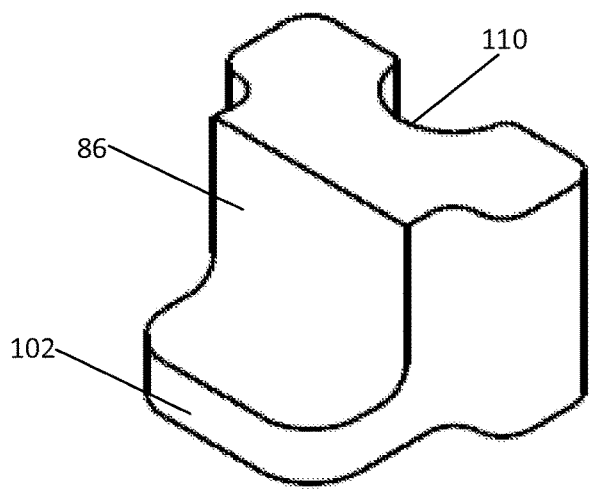
FIG. 7A shows a top front perspective view of the insert shown at FIG. 6A.

FIG. 7A shows a top, back perspective view of the insert 86. As shown in FIG. 7A, the insert 86 has a tab 102, which can facilitate the manipulation of the insert 86 by a user. The insert 86 defines a top recess 110, which, as will be described further below, is to accommodate a dispensing tube.

Figure 7B:
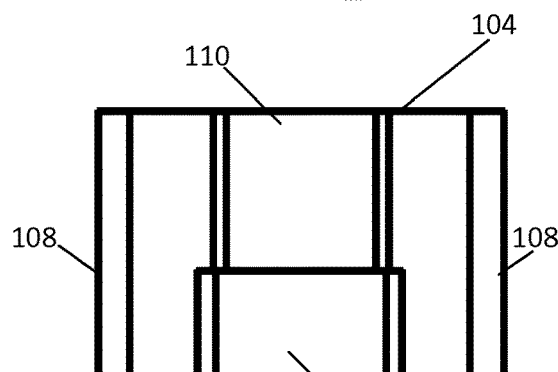
FIG. 7B shows a back view of the insert shown at FIG. 7A.

FIG. 7B shows a front elevation view of the insert 86 where the top 104, the bottom 106, and the sidewalls 108 are shown. FIG. 7B also shows the top recess 110 and an inner wall portion 112.

Figure 7C:
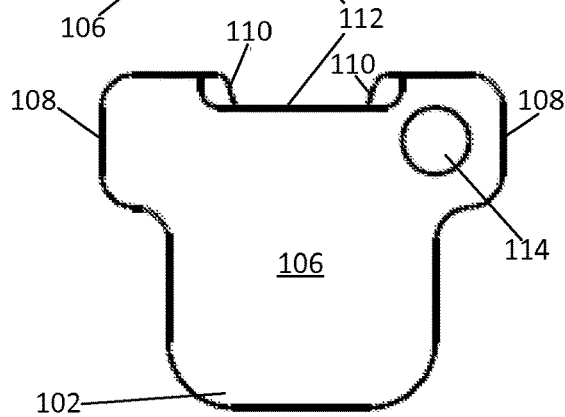
FIG. 7C shows a top view of the insert shown at FIG. 7A.

FIG. 7C shows a bottom view of the insert 86 where the inner wall portion 112 is shown as well as part of the top recess 110. Also shown in FIG. 7C is a cylindrical hole 114. The insert 86 can be pivotally connected to the bracket 88 (FIG. 6A) by pushing down on the insert 86 from the installed position to the intermediary position to fit the cylindrical post 90 into the cylindrical 114.

Figure 7D:
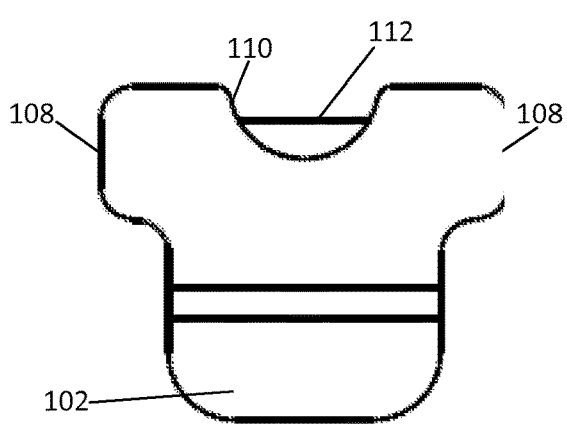
FIG. 7D shows a bottom view of the insert shown at FIG. 7A.

FIG. 7D shows a top view of the insert 86 where the top recess 110, the inner wall portion 112, the sidewalls 108, and the tab 102 are shown.

Figure 8A:
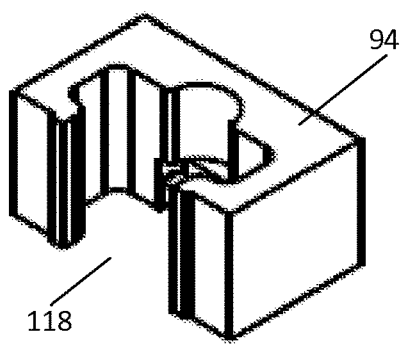
FIG. 8A shows a top front perspective view of the holder shown at FIG. 6B.

FIG. 8A shows a top front perspective view of the holder 94, which defines an opening 118 that allows passage to the tab 102 of the insert 106 as the insert 86 is inserted into and removed from the holder 94.

Figure 8B:
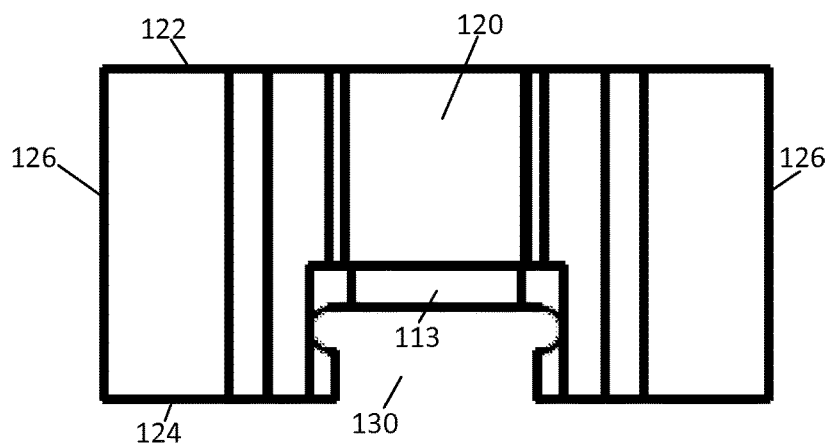
FIG. 8B shows a front view of the holder shown at FIG. 8A.

FIG. 8B shows a front elevation view of the holder 94. The holder defines a recess 120 that aligns, in concert with the recess 110 of the insert 86 (see FIG. 7B), a dispensing tube into the pinch valve 84. The holder 94 defines a channel 130 for the tip 96 of the plunger 92 to penetrate the pinch valve 84. FIG. 8B also shows the top 122, the bottom 124, and the sidewalls 126 of the holder 94. The holder 94 also defines an opposite wall portion 113, which, when the insert 86 is in the installed position, is opposite the inner wall portion 112 of the insert 86.

Figure 8C:
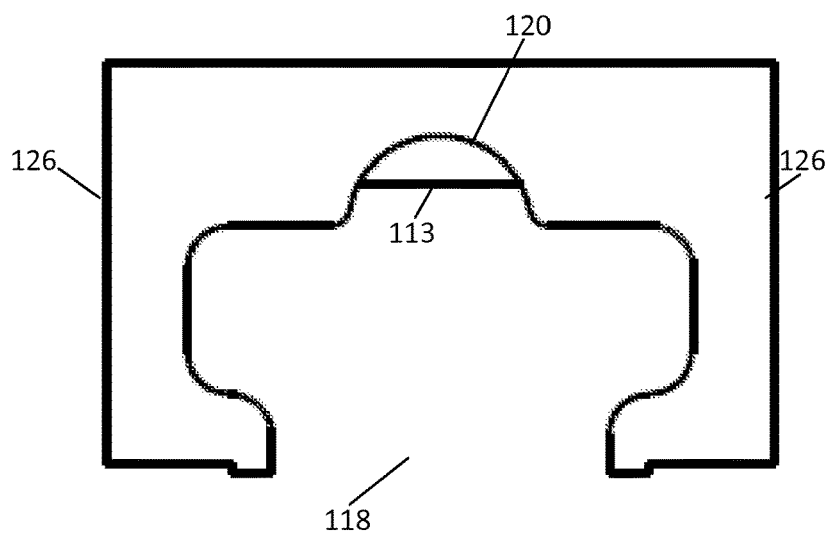
FIG. 8C shows a top view of the holder shown at FIG. 8A.

FIG. 8C shows a top view of the holder 94 where the recess 120, the opening 118, the opposite wall portion 113, and the sidewalls 126 are shown.

Figure 8D:
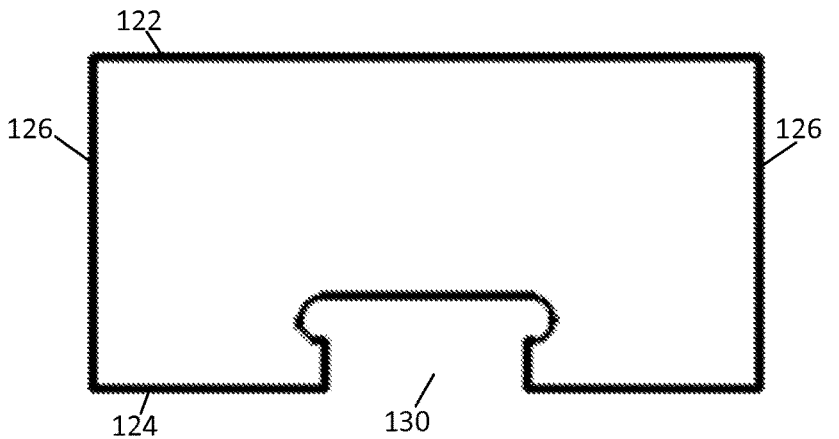
FIG. 8D shows a bottom view of the holder shown at FIG. 8A.

FIG. 8D shows a back elevation view of the holder 94.

Figure 8E:
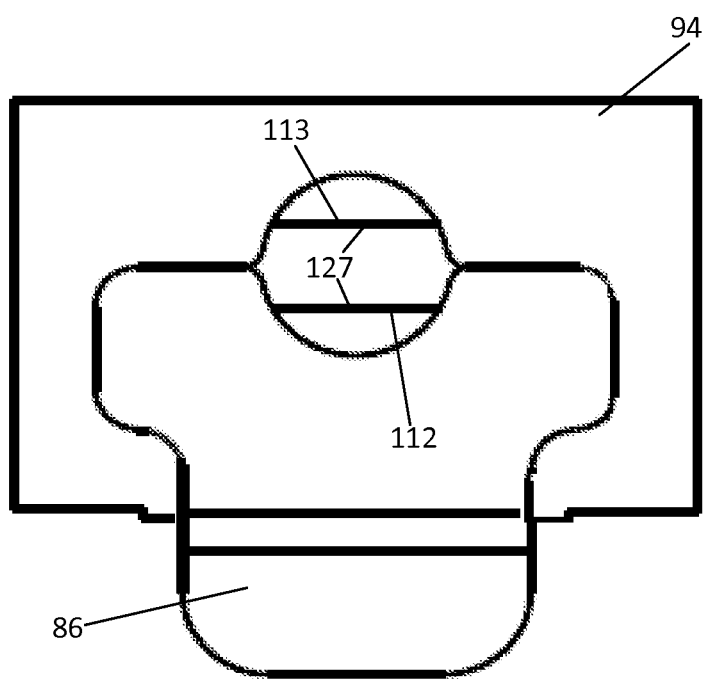
FIG. 8E shows a top view of the insert of FIG. 6B installed in the holder of FIG. 6B.

FIG. 8E shows a top view of the insert 86 in the installed position; that is, installed in the holder 94. Shown in FIG. 8E is a throttle portion 127, defined as the space between the inner wall portion 112 of the insert 86 and the opposite inner wall portion 113 of the holder 94.

To install a dispensing tube in the pinch valve 84, the pinch valve is arranged with the insert 86 in the open position shown at FIG. 6C. The dispensing tube is placed in the holder 94 with the dispensing tube disposed to be aligned with recess 120 of the holder 94 and the recess 110 of the insert 86 when the insert 86 is moved back to the installed position by is pivoting the insert 86 from the open position to the intermediary position shown at FIG. 6B, and from the intermediary position, moving the insert 86 upwardly to the installed position. Once at the installed position, the dispensing tube is aligned with the plunger tip 96, which can push the dispensing tube against the inner wall portion 112 of the insert 86. The plunger 92 is configured to generate sufficient force for the plunger tip 96 pushing the dispensing tube against the inner wall 112 to cause the dispensing tube to collapse on itself and prevent liquid from flowing through the dispensing tube. In this position, the plunger 92 and plunger tip 96 can be said to be in a pinch position, from where it can move to a flow position where the plunger 92 and plunger tip 96 are retracted from the inner wall portion 112 of the insert 86, the dispensing tube is no longer collapsed onto itself, and liquid can flow through the dispensing tube.

When the insert 86 is in the installed position as shown at FIG. 6A, it can be moved upwardly, along an axis (in this embodiment, a vertical axis) to a removed position. In this embodiment of the pinch valve of the present disclosure, the vertical axis along which the insert is moved upwardly is parallel to the pivot axis defined by the cylindrical post 90 shown at FIG. 6A. The removal of the insert 86 from the holder 94, i.e., moving the insert 86 from the installed position to the removed position can be done by hand, without having to use any tools. Cleaning of the insert 86 through any suitable means, for example, soap and water, can then be carried out and, once clean, insert 86 can be put back in the holder 94.

Figure 9:
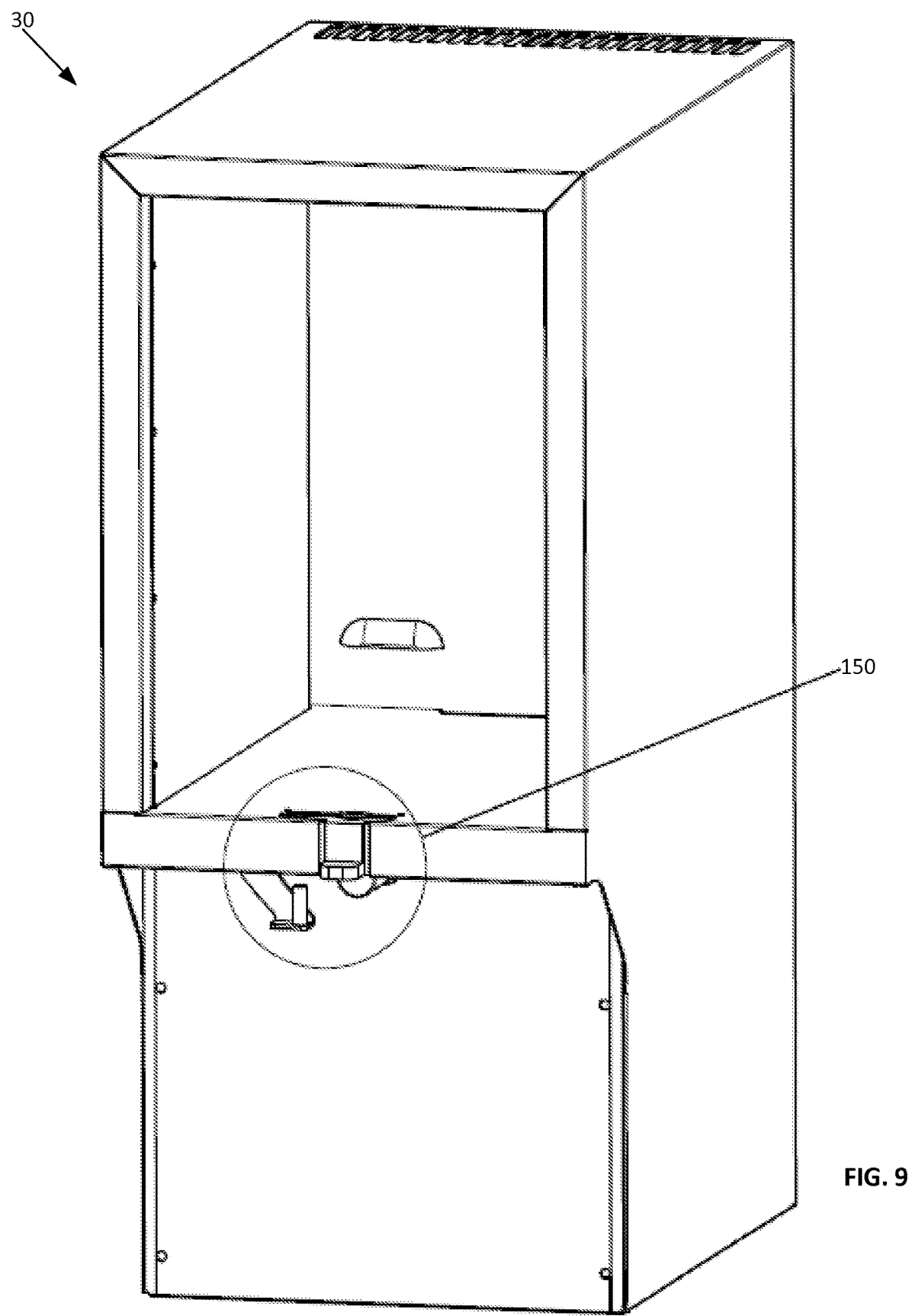
FIG. 9 shows a perspective view of a liquid dispensing machine fitted with another embodiment of a pinch valve in accordance with the present disclosure.

FIG. 9 shows a perspective view of the liquid dispensing machine 30 of FIG. 1 but this time having, in another example of a pinch valve in accordance with the present disclosure, a pinch valve 150.

Figure 10A:
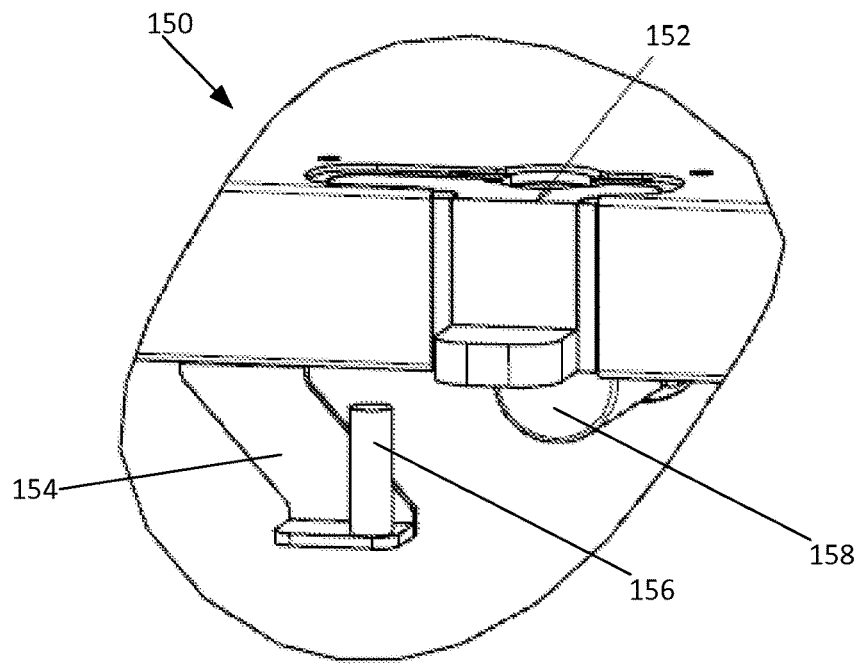
FIG. 10A shows a close-up perspective view of the pinch valve of FIG. 9.

FIG. 10A shows a close-up perspective view of the pinch valve 150 where an insert 152 is shown in an installed position where the insert 152 is installed in a holder (not shown). In this embodiment, the holder and the insert 152 are dimensioned to interfere with each other when the insert 152 is in the installed position. The insert 152 is thus held in the holder by an interference fit.

Also shown in FIG. 10A is a bracket 154 onto which the insert 152 can be pivotally mounted through complementary mating features defined by the bracket 154 and the insert 152. In this example, the bracket 154 defines (or has) a cylindrical post 156 and the insert 152 defines a cylindrical opening (not shown) that receives the cylindrical post 156 when the insert is pushed down from the installed position to an intermediary position, as will be described further below. Further shown in FIG. 10A is a portion of a plunger 158.

Figure 10B:
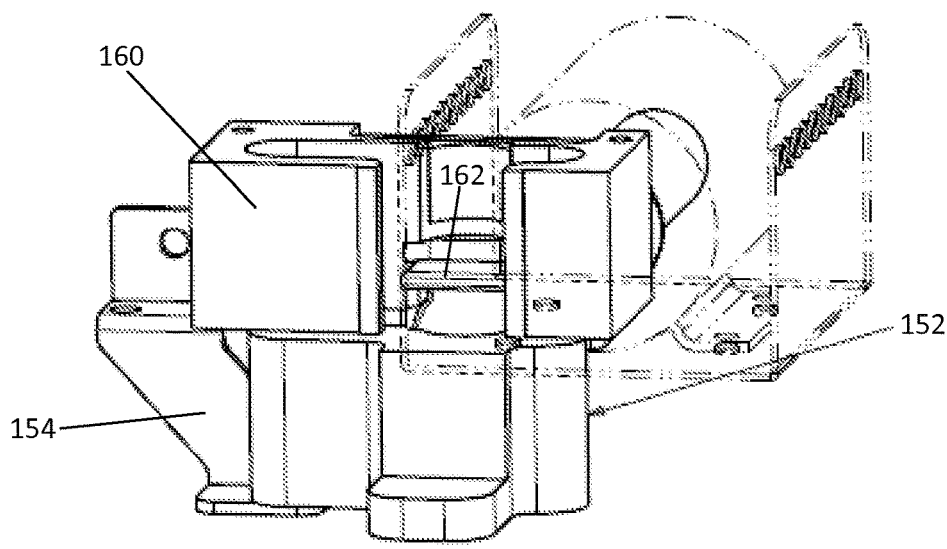
FIG. 10B shows a further perspective view of the pinch valve of FIG. 9, with an insert of the pinch valve in an intermediary position and with a holder.

FIG. 10B shows a further perspective view of the pinch valve 150 where the insert 152, the bracket 154, and a holder 160 are shown. The insert 152 is shown in an intermediary position where the insert 152 is pivotally connected to the bracket 154. Further shown in FIG. 10B is the tip 162 of the plunger 158. The tip 162 of the plunger is for pushing a dispensing tube (not shown), installed in the pinch valve 150, against an inner wall of the insert 152. The plunger 158 and tip 162 of the plunger are part of a plunger assembly shown at reference numeral 164 in FIG. 10C.

Figure 10C:
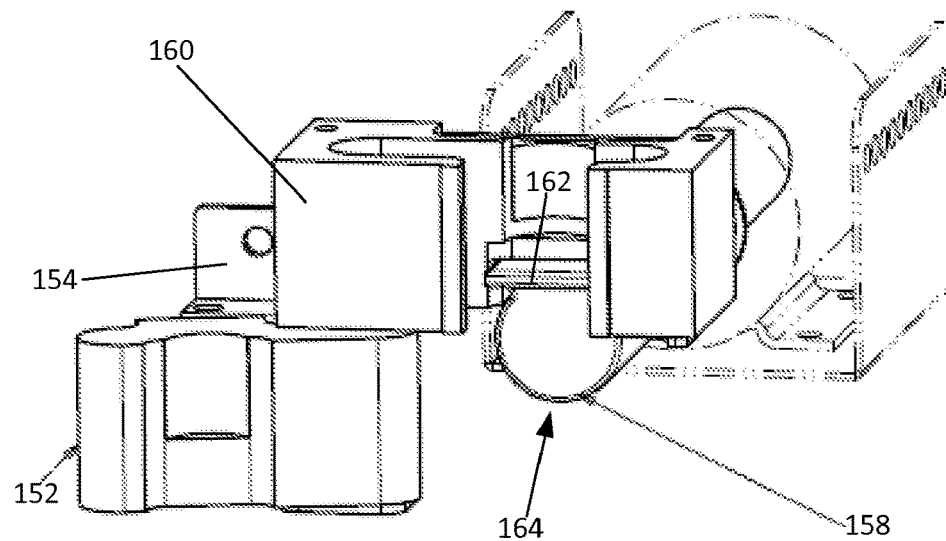
FIG. 10C shows a further perspective view of the pinch valve of FIG. 9, with an insert of the pinch valve in an open position.

FIG. 10C shows yet another perspective view of the pinch valve 150 with the insert 152 pivoted 180 degrees to an open position. Pivoting the insert 152 to the open position can facilitate the insertion of a dispensing tube (not shown) in the pinch valve 150 and can also facilitate the removal of the dispensing tube from the pinch valve 150.

FIG. 10C further shows the plunger 158, the tip 162 of the plunger, and the plunger assembly 164.

The holder 160 and the bracket 154 can be secured to the liquid dispensing machine 30 through any suitable means such as, but not limited to, fasteners (bolts, nuts, screws, etc.)

Figure 11A:
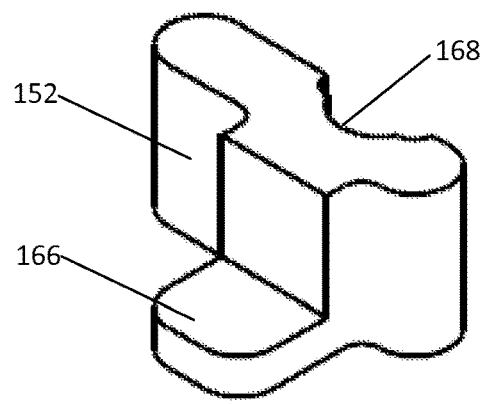
FIG. 11A shows a top front perspective view of the insert shown at FIG. 10B.

FIG. 11A shows a back perspective view of the insert 152. As shown in FIG. 11A, the insert 152 has a tab 166, which can facilitate the manipulation of the insert 152 by a user. The insert 152 defines a top recess 168, which, as will be described further below, is to accommodate a dispensing tube.

Figure 11B:
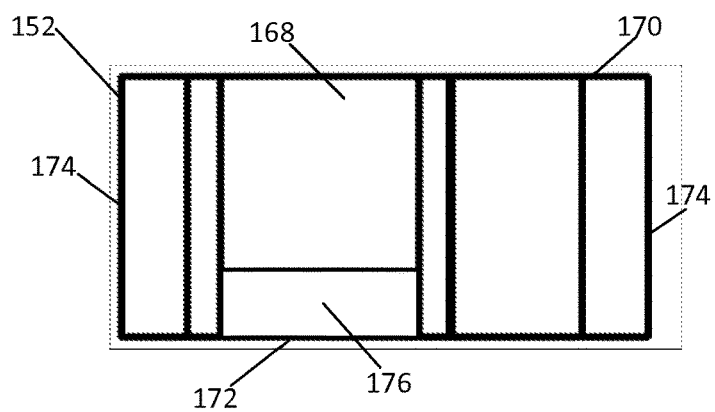
FIG. 11B shows a back view of the insert shown at FIG. 11A.

FIG. 11B shows a front elevation view of the insert 152 where the top 170, the bottom 172, and the sidewalls 174 are shown. FIG. 11B also shows the top recess 168 and an inner wall portion 176.

Figure 11C:
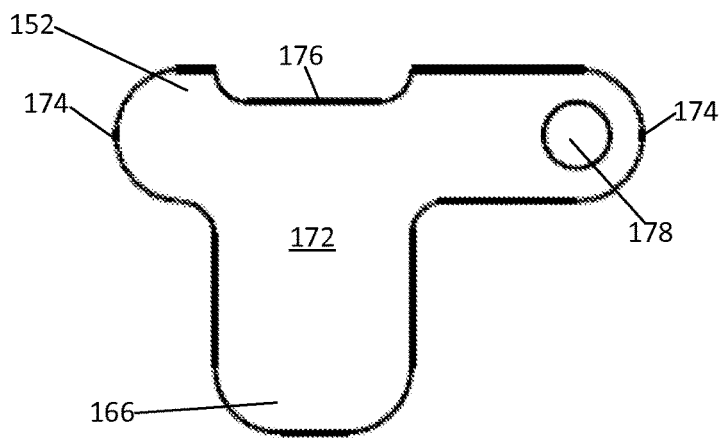
FIG. 11C shows a top view of the insert shown at FIG. 11A.

FIG. 11C shows a bottom view of the insert 152 where the inner wall portion 176 is shown. Also shown in FIG. 11C is a cylindrical hole 178. The insert 152 can be pivotally connected to the bracket 154 (FIG. 10A) by pushing down on the insert 152 in the installed position to fit the cylindrical post 156 into the cylindrical hole 178.

Figure 11D:
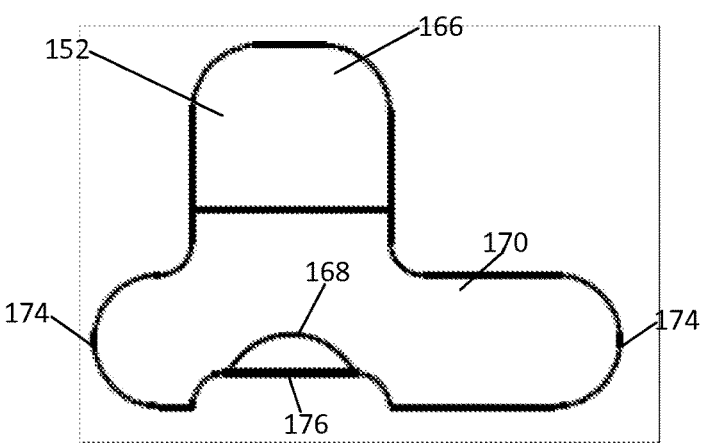
FIG. 11D shows a bottom view of the insert shown at FIG. 11A.

FIG. 11D shows a top view of the insert 152 where the top recess 168, the inner wall portion 176, the sidewalls 174, and the tab 166 are shown.

Figure 12A:
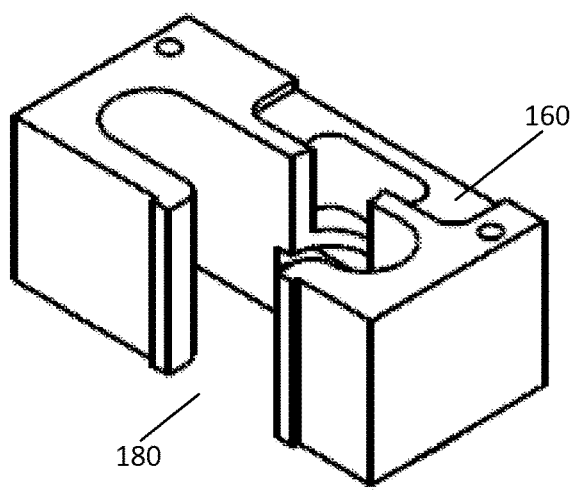
FIG. 12A shows a top front perspective view of the holder shown at FIG. 10B.

FIG. 12A shows a top front perspective view of the holder 160, which defines an opening 180 that allows passage to the tab 166 of the insert 152 as the insert 152 is inserted into and removed from the holder 160.

Figure 12B:
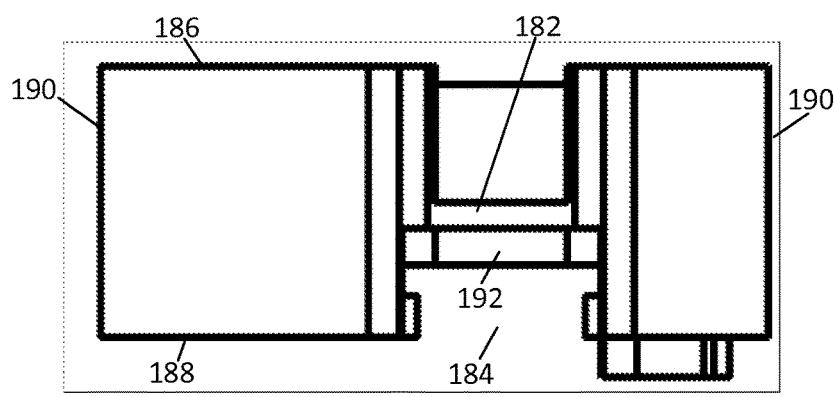
FIG. 12B shows a front view of the holder shown at FIG. 12A.

FIG. 12B shows a front elevation view of the holder 160. The holder defines a recess 182 to align, in concert with the top recess 168 of the insert 152 (see FIG. 11B), a dispensing tube into the pinch valve 150. The holder 160 defines a channel 184 for the tip 162 of the plunger 158 to penetrate the pinch valve 150. FIG. 12B also shows the top 186, the bottom 188, and the sidewalls 190 of the holder 160. The holder 160 also defines an opposite wall portion 192, which, when the insert 152 is in the installed position, is opposite the inner wall portion 176 of the insert 152.

Figure 12C:
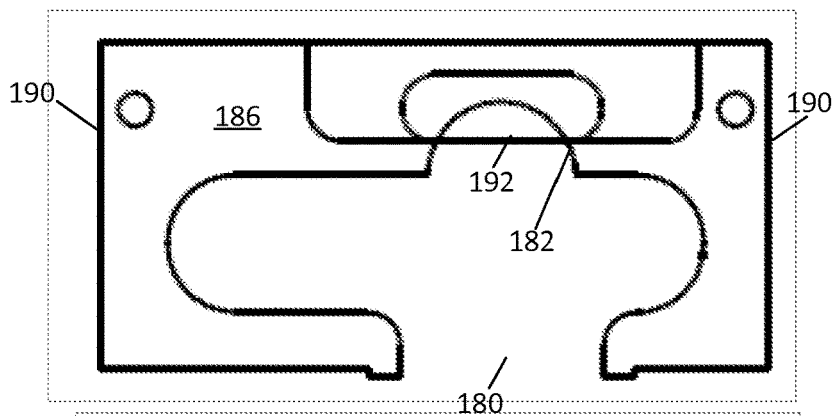
FIG. 12C shows a top view of the holder shown at FIG. 12A.

FIG. 12C shows a top view of the holder 160 where the recess 182, the opening 180, the opposite wall portion, and the sidewalls 190 are shown.

Figure 12D:
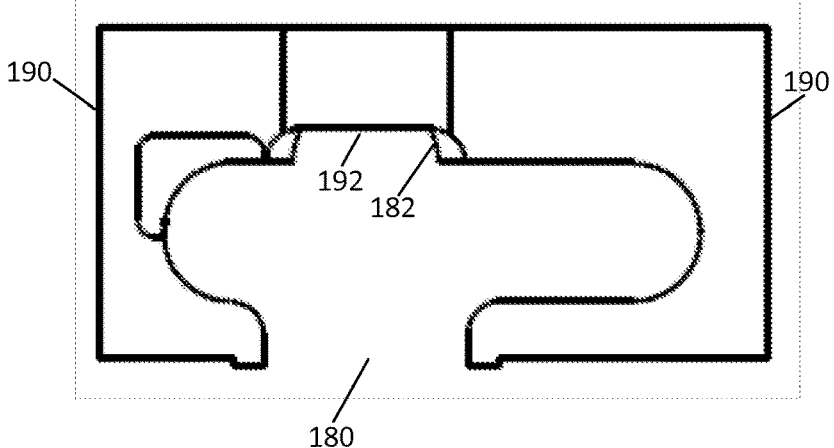
FIG. 12D shows a bottom view of the holder shown at FIG. 12A.

FIG. 12D shows a bottom view of the holder 160.

Figure 12E:
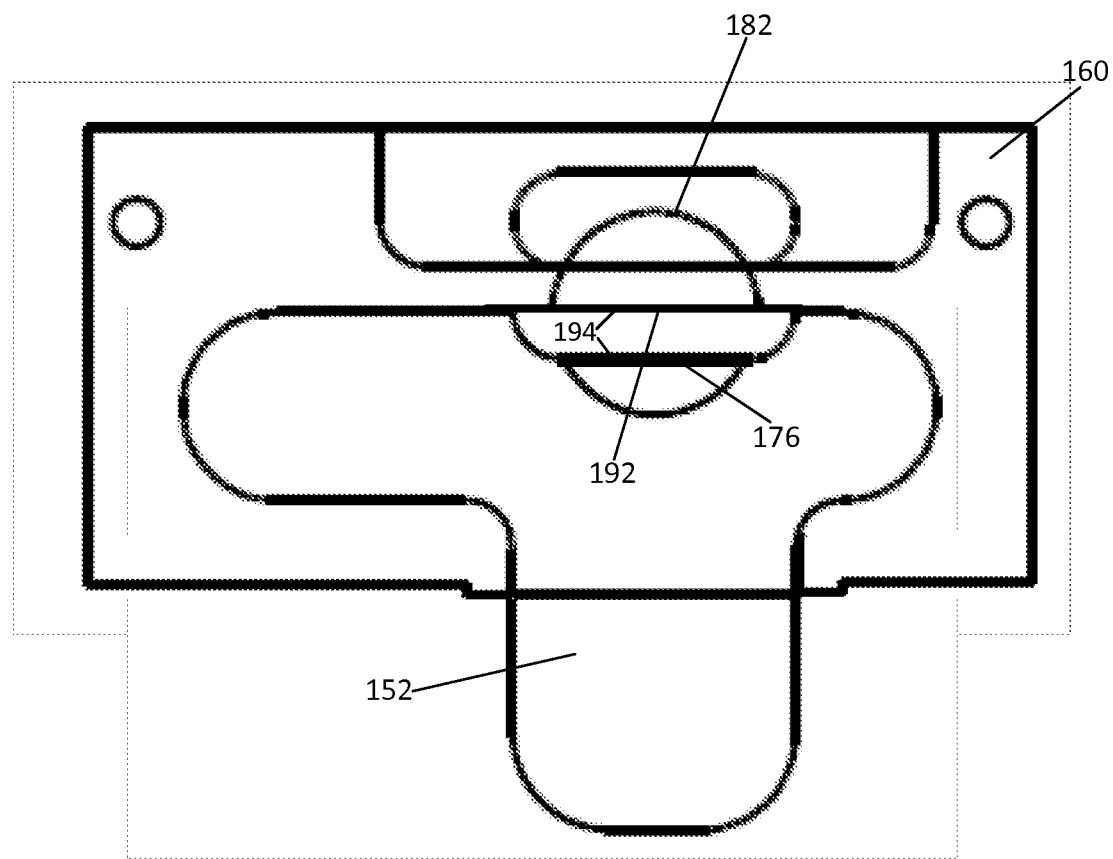
FIG. 12E shows a top view of the insert of FIG. 10B installed in the holder of FIG. 10B.

FIG. 12E shows a top view of the insert 152 in the installed position; that is, installed in the holder 160. Shown in FIG. 12E is a throttle portion 194, defined as the space between the inner wall portion 176 of the insert 152 and the opposite inner wall portion 192 of the holder 160.

To install a dispensing tube in the pinch valve 150, the pinch valve is arranged with the insert 152 in the open position as shown at FIG. 10C. The dispensing tube is placed in the holder 160 with the dispensing tube disposed to be aligned with recess 182 of the holder 160 and the recess 168 of the insert 152 when the insert is pivoted back to the intermediary position shown at FIG. 10B. From the intermediary position, the insert 152 is moved upwardly to the installed position. Once at that installed position, the dispensing tube is aligned with the plunger tip 162, which can push the dispensing tube against the inner wall portion 176 of the insert 152. The plunger 158 is configured to generate sufficient force for the plunger tip 162 pushing the dispensing tube against the inner wall portion 176 to cause the dispensing tube to collapse on itself and prevent liquid from flowing through the dispensing tube. In this position, the plunger 158 and plunger tip 162 can be said to be in a pinch position, from where it can move to a flow position where the plunger 158 and plunger tip 162 are retracted from the inner wall portion 176, the dispensing tube is no longer collapsed onto itself, and liquid can flow through the dispensing tube.

When the insert 152 is in the installed position as shown at FIG. 10A, it can be moved upwardly, along an axis (in this embodiment, a vertical axis) to a removed position. In this embodiment of the pinch valve of the present disclosure, the vertical axis along which the insert is moved upwardly is parallel to the pivot axis defined by the cylindrical post 156 shown at FIG. 10A. The removal of insert 152 from the holder 160, i.e., moving the insert 152 from the installed position to the removed position can be done by hand, without having to use any tools. Cleaning of the insert 152 through any suitable means, for example, soap and water, can then be carried out and, once clean, insert 152 can be put back in the holder 160.

Figure 13:
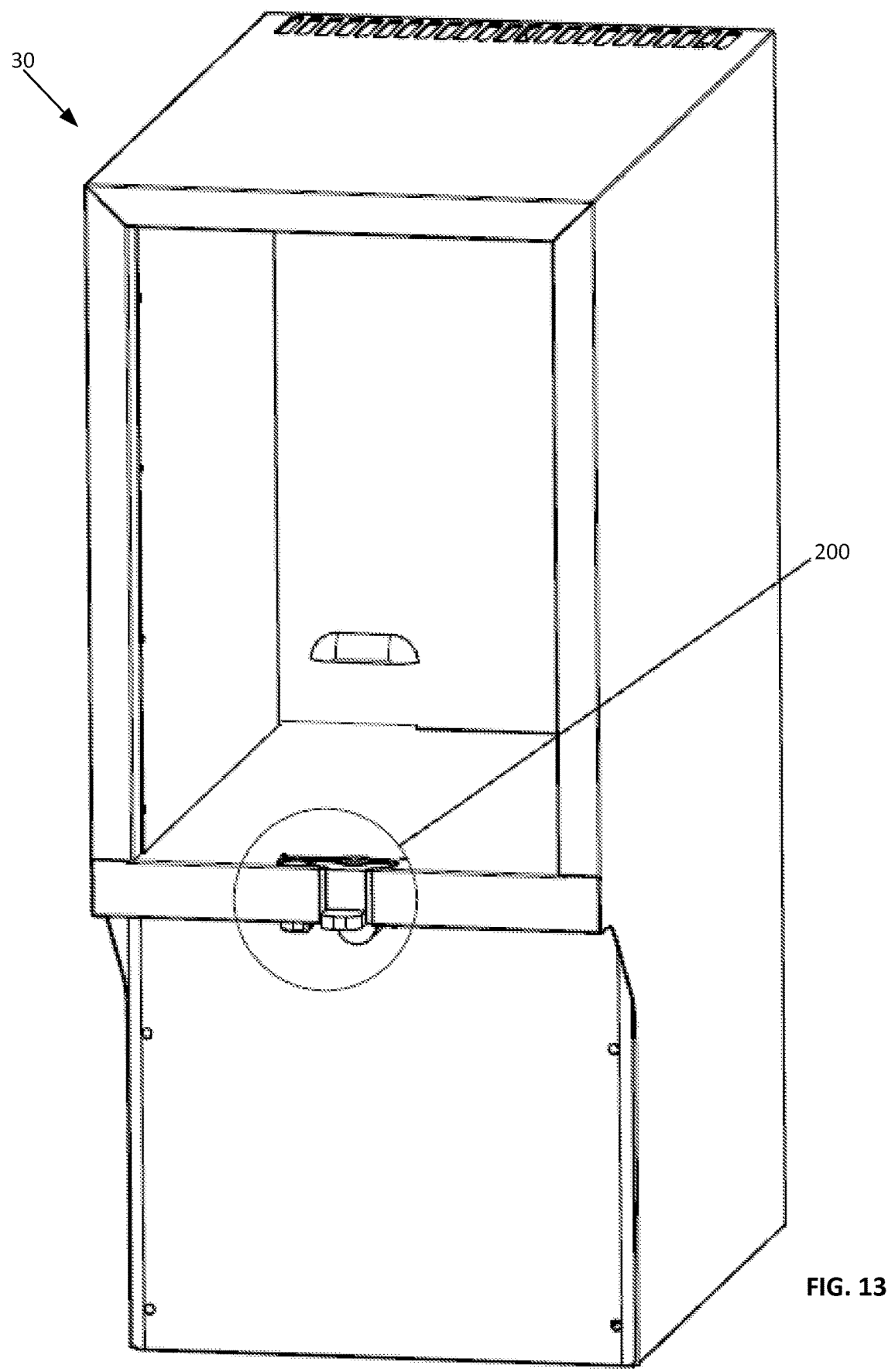
FIG. 13 shows a perspective view of a liquid dispensing machine fitted with another embodiment of a pinch valve in accordance with the present disclosure.

FIG. 13 shows a perspective view of the liquid dispensing machine 30 of FIG. 1 but this time having, in another example of a pinch valve in accordance with the present disclosure, a pinch valve 200.

Figure 14A:
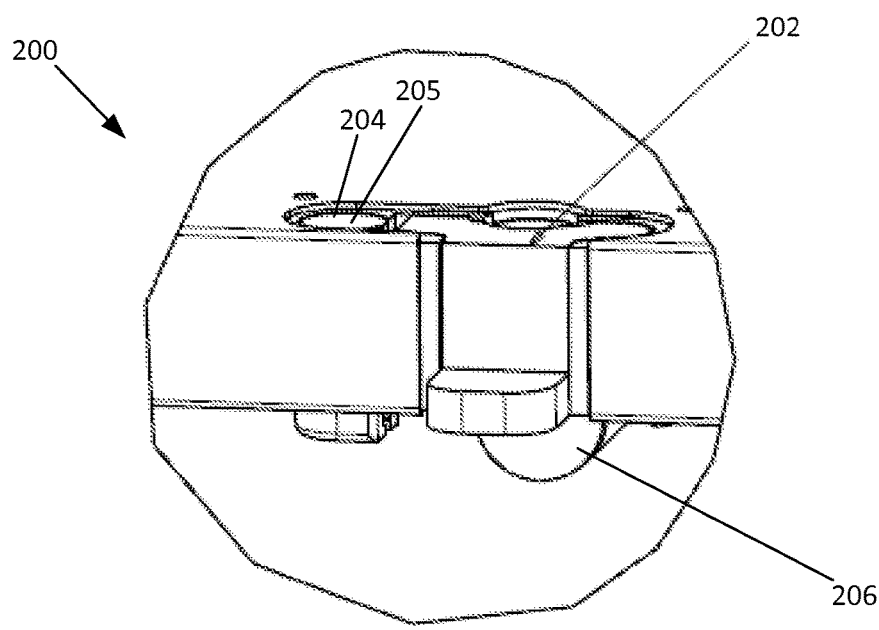
FIG. 14A shows a close-up perspective view of the pinch valve of FIG. 13.

FIG. 14A shows a close-up perspective view of the pinch valve 200 where an insert 202 is shown in an installed position in a holder (not shown). In this embodiment, the holder and the insert 202 are dimensioned to interfere with each other when the insert 202 is in the installed position. The insert 202 is thus held in the holder by an interference fit.

Figure 16A:
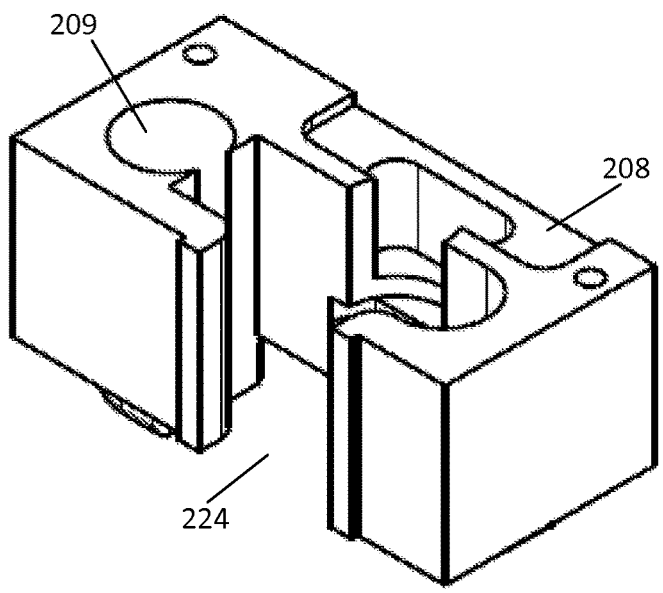
FIG. 16A shows a top front perspective view of the holder shown at FIG. 14B.

Also shown in FIG. 14A is a button and bead unit 204, which will be described in more detail further below. The button and bead unit 204 is integral with the insert 202. The button and bead unit 204 includes a button 205. FIG. 16A further shows a portion of a plunger 206.

Figure 14B:
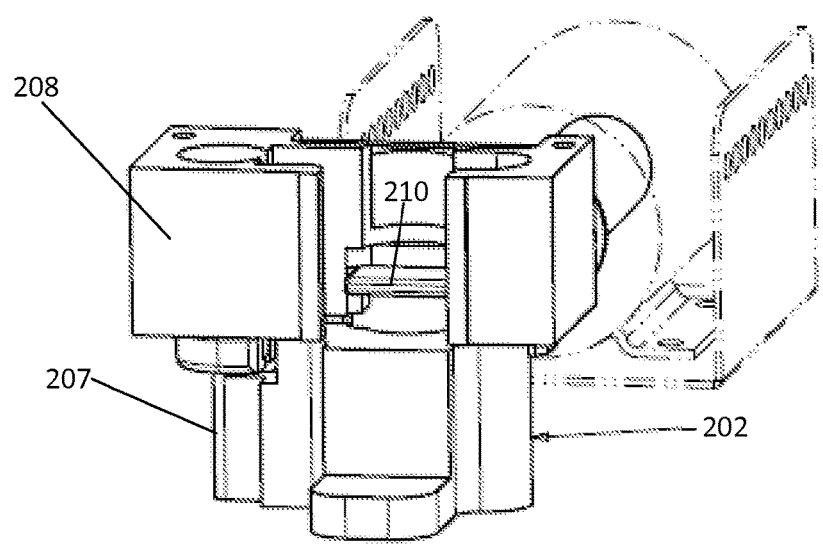
FIG. 14B shows a further perspective view of the pinch valve of FIG. 13, with an insert of the pinch valve in an intermediary position and with a holder.

FIG. 14B shows a further perspective view of the pinch valve 200 where the insert 202 and a holder 208 are shown. The insert 202 is shown in an intermediary position where the insert 202 is pivotally connected to the holder 208. A bead 207 of the button and bead unit 204 is also shown. Further shown in FIG. 14B is the tip 210 of the plunger 206. The tip 210 of the plunger is for pushing a dispensing tube (not shown), installed in the pinch valve 200, against an inner wall of the insert 202. The tip 210 of the plunger is part of a plunger assembly.

Figure 14C:
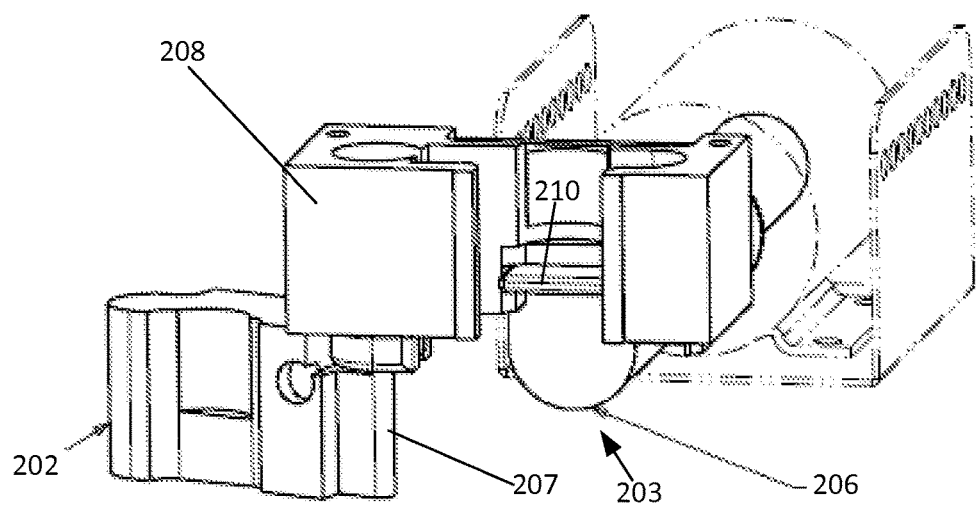
FIG. 14C shows a further perspective view of the pinch valve of FIG. 13, with an insert of the pinch valve in an open position.

FIG. 14C shows yet another perspective view of the pinch valve 200 with the insert 202 pivoted 180 degrees to an open position. Pivoting the insert 202 to the open position can facilitate the insertion of a dispensing tube (not shown) in the pinch valve 200 and can also facilitate the removal of the dispensing tube from the pinch valve 200.

FIG. 14C further shows the plunger 206 and the tip 210 of the plunger, which are part of the plunger assembly 203. FIG. 16C also shows the bead 207.

The holder 208 can be secured to the liquid dispensing machine 30 through any suitable means such as, but not limited to, fasteners (bolts, nuts, screws, etc.)

Figure 15A:
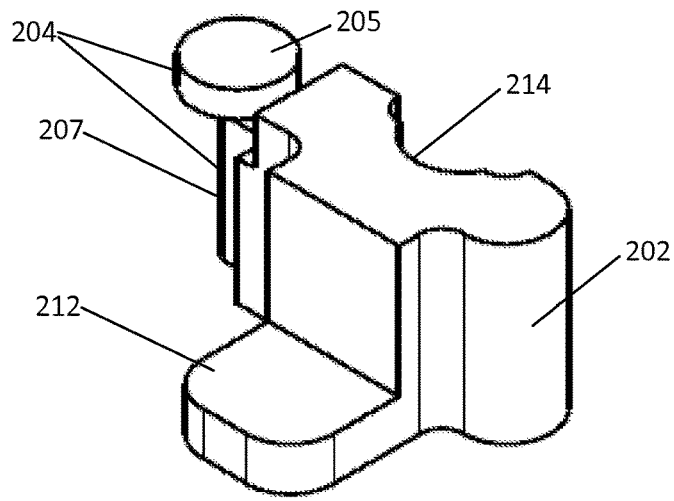
FIG. 15A shows a top front perspective view of the insert shown at FIG. 14B.

FIG. 15A shows a top, back perspective view of the insert 202. As shown in FIG. 15A, the insert 202 has a tab 212, which can facilitate the manipulation of the insert 202 by a user. The insert 202 defines a top recess 214, which, as will be described further below, is to accommodate a dispensing tube. FIG. 15A further shows the button and bead unit 204, the button 205, and the bead 207.

Figure 15B:
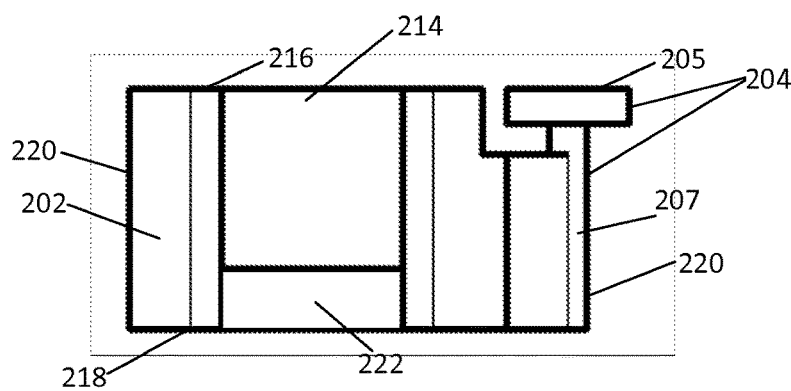
FIG. 15B shows a back view of the insert shown at FIG. 15A.

FIG. 15B shows a front elevation view of the insert 202 where the top 216, the bottom 218, and the sidewalls 220 are shown. FIG. 15B also shows the top recess 214 and an inner wall portion 222.

Figure 15C:
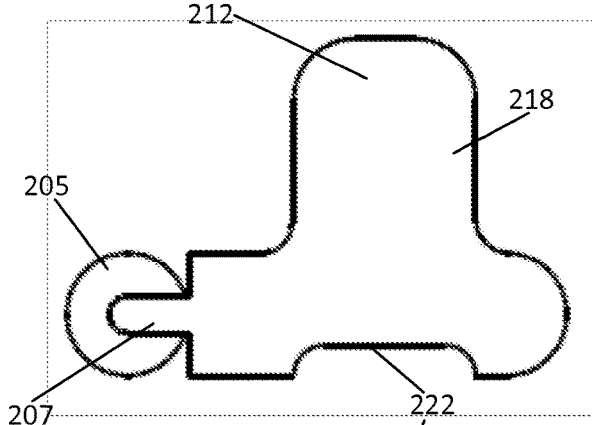
FIG. 15C shows a top view of the insert shown at FIG. 15A.

FIG. 15C shows a bottom view of the insert 202 where the inner wall portion 222, the tab 212, the button 205, and the bead 207 are shown.

Figure 15D:
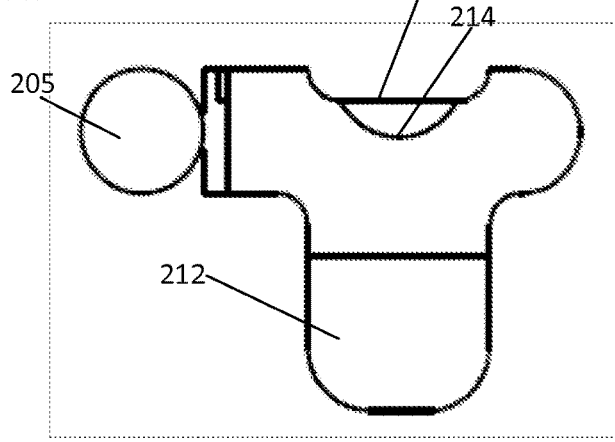
FIG. 15D shows a bottom view of the insert shown at FIG. 15A.

FIG. 15D shows a top view of the insert 202 where the top recess 214, the inner wall portion 222, the button, and the tab 212 are shown.

FIG. 16A shows a top, front perspective view of the holder 208, which defines an opening 224 that allows passage to the tab 212 of the insert 202 as the insert 202 is inserted into and removed from the holder 208. Also shown at FIG. 16A is a channel 209 defined by the holder 208. The channel 209 allows passage of the button 205 when the insert 202 is moved from the installed position to the intermediary position.

Figure 16B:
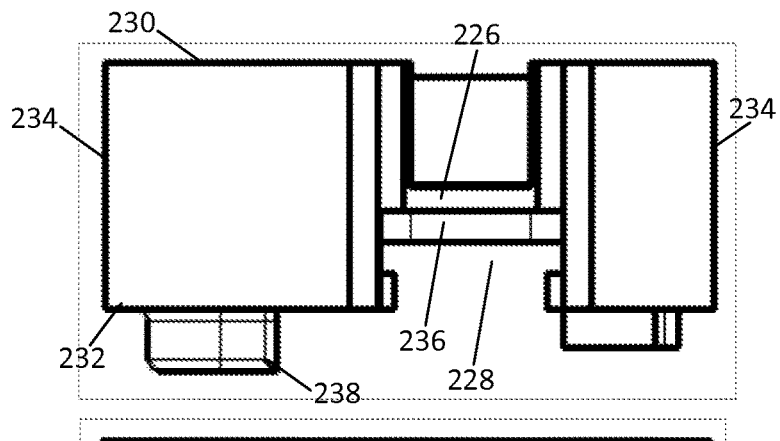
FIG. 16B shows a front view of the holder shown at FIG. 16A.
Figure 16C:
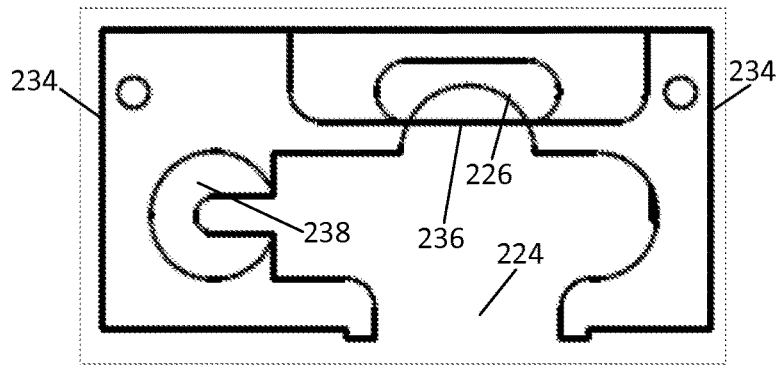
FIG. 16C shows a top view of the holder shown at FIG. 16A.

FIG. 16B shows a front elevation view of the holder 208. The holder defines a recess 226 to align, in concert with the top recess 214 of the insert 202 (see FIG. 15B), a dispensing tube into the pinch valve 200. The holder 208 defines a channel 228 for the tip 210 of the plunger 206 to penetrate the pinch valve 200. FIG. 16B also shows the top 230, the bottom 232, and the sidewalls 234 of the holder 208. The holder 208 also defines an opposite wall portion 236, which, when the insert 202 is in the installed position, is opposite the inner wall portion 222 of the insert 202. Additionally, the holder 208 defines a button housing 238 in which the button 205 of the insert 202 is received when the insert 202 is in the intermediary position shown at FIG. 16B. The button 205 and the button housing are dimensioned to allow the button 205 to rotate in the button housing 238 when the insert 202 is moved from the intermediary position to the open position shown at FIG. 14C.

FIG. 16C shows a top view of the holder 208 where the recess 226, the opening 224, the sidewalls 234, the opposite wall portion 236, and the button housing 238 are shown.

Figure 16D:
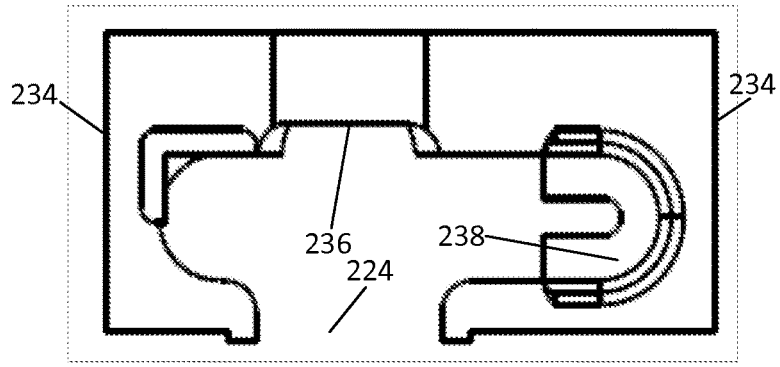
FIG. 16D shows a bottom view of the holder shown at FIG. 16A.

FIG. 16D shows a bottom view of the holder 208.

Figure 16E:
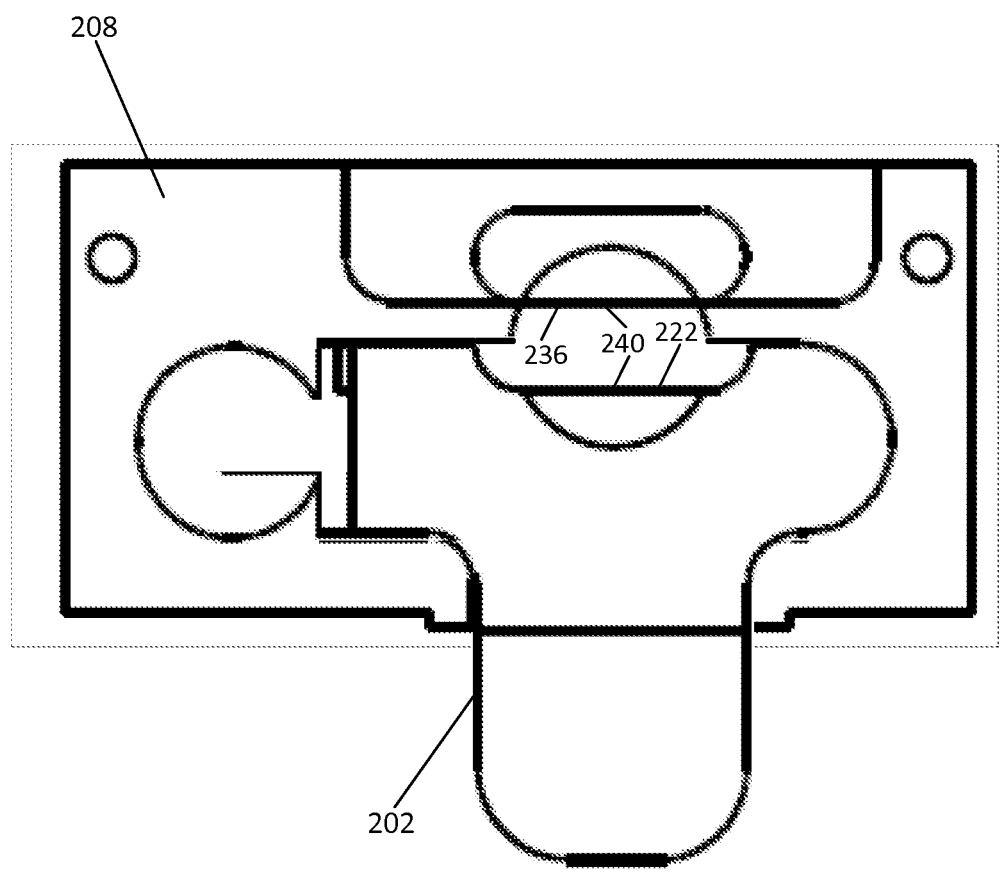
FIG. 16E shows a top view of the insert of FIG. 10B installed in the holder of FIG. 14B.

FIG. 16E shows a top view of the insert 202 in the installed position; that is, installed in the holder 208. Shown in FIG. 16E is a throttle portion 240, defined as the space between the inner wall portion 222 of the insert 202 and the opposite inner wall portion 236 of the holder 208.

To install a dispensing tube in the pinch valve 200, the pinch valve is arranged with the insert 202 in the open position shown at FIG. 14C. The dispensing tube is placed in the holder 208 with the dispensing tube disposed to be aligned with recess 226 of the holder 208 and the recess 214 of the insert 202 when the insert is pivoted back to the intermediary position shown at FIG. 14B. From the intermediary position, the insert 202 is moved upwardly to the installed position. Once at that installed position, the dispensing tube is aligned with the plunger tip 210, which can push the dispensing tube against the inner wall portion 222 of the insert 202. The plunger 206 is configured to generate sufficient force for the plunger tip 210 pushing the dispensing tube against the inner wall portion 222 to cause the dispensing tube to collapse on itself and prevent liquid from flowing through the dispensing tube. In this position, the plunger 206 and plunger tip 210 can be said to be in a pinch position, from where it can move to a flow position where the plunger 206 and plunger tip 210 are retracted from the inner wall portion 222, where the dispensing tube is no longer collapsed onto itself, and liquid can flow through the dispensing tube.

When the insert 202 is in the installed position as shown at FIG. 14A, it can be moved upwardly, along an axis (in this embodiment, a vertical axis) to a removed position. In this embodiment of the pinch valve of the present disclosure, the vertical axis along which the insert is moved upwardly is parallel to the channel 209 shown at FIG. 16A. The channel 209 also defines the pivot axis about which the insert 202 pivots when moved from the intermediary position (FIG. 14B) to the open position (FIG. 14C). The removal of insert 202 from the holder 208, i.e., moving the insert 202 from the installed position to the removed position can be done by hand, without having to use any tools. Cleaning of the insert 202 through any suitable means, for example, soap and water, can then be carried out and, once clean, insert 202 can be re-installed in the holder 208.

FIG. 17 shows a top, front perspective view of yet another embodiment of a pinch valve of the present disclosure. The pinch valve 242 shown at FIG. 17 has an insert 244 installed in a holder 246. The insert 244 defines a button and bead unit 248, which comprises the button 249, configured to allow the insert 244 to be pushed downward into an intermediary position, shown at FIG. 18. FIG. 18 also shows a bead 250 of the button and bead unit 248. From the intermediary position shown at FIG. 18, the insert 244 can be rotated or pivoted to an open position shown at FIGS. 19 and 20.

The holder 246 defines a channel 252 that guides the button 249 (or allows passage of the button 249) as the insert 244 is moved from the installed position shown at FIG. 17 to the intermediary position shown at FIG. 18. The channel 252 has a diameter that, in some embodiments, is reduced at the top portion 254 to prevent passage of the button 249. That is, to prevent the insert 244 from being removed by lifting the insert 244 along the direction indicated by the arrow 256 (FIG. 17). FIG. 19 also shows an inner wall portion 260 of the insert 244, an arrow 264, and a groove 266.

Figure 21:
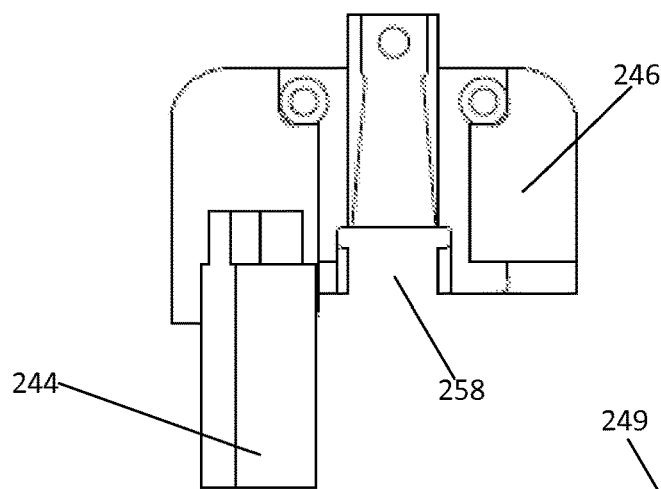
FIG. 21 shows front view of the pinch valve of FIG. 17, with the insert in the open position.

FIG. 21 shows a front view of the pinch valve 242 with the insert 244 in the open position. The holder 246 defines a recess 258 that allows for passage of a plunger tip. The plunger tip is to collapse a dispensing tube against the inner wall portion 260 (shown at FIG. 19) of the insert 244.

Figure 22:
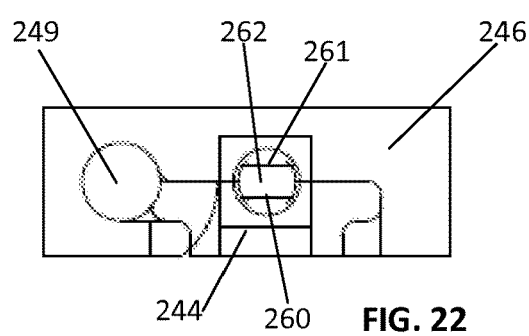
FIG. 22 shows a top view of the pinch valve of FIG. 17, with the insert installed in a holder.

FIG. 22 shows a top view of the insert 244 in the installed position. That is, installed in the holder 246. As in some of the other embodiments, the insert 244 and the holder 246 define a throttle portion 262, which is defined as the space between the inner wall 260 of the insert 244 and an opposite wall portion 261 of the holder 246.

Figure 23:
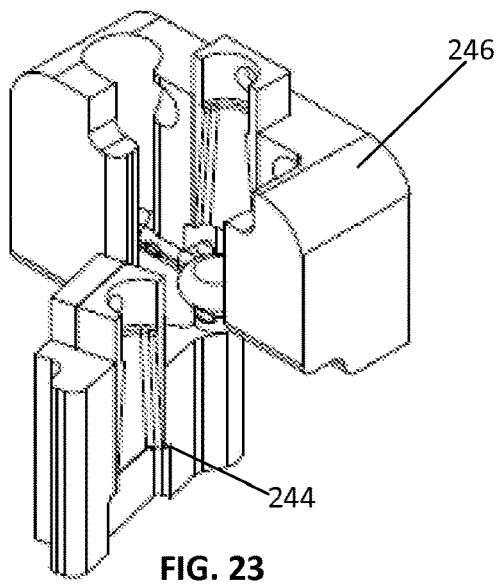
FIG. 23 shows a perspective view of the pinch valve of FIG. 17, with the insert ready to be removed from the holder.
Figure 24:
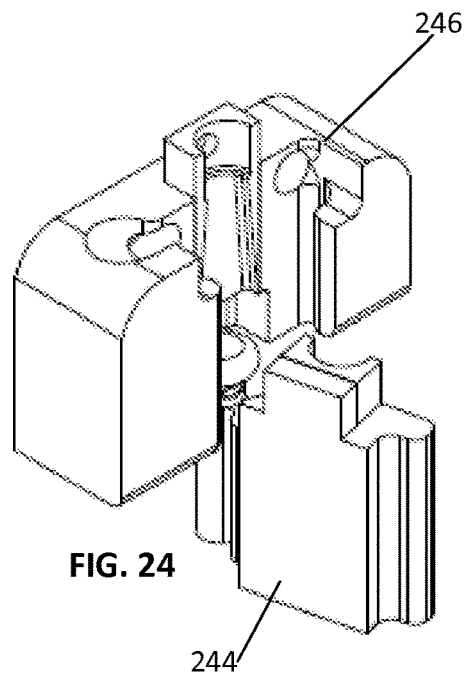
FIG. 24 shows another perspective view of the pinch valve of FIG. 17, with the insert ready to be removed from the holder.
Figure 25:
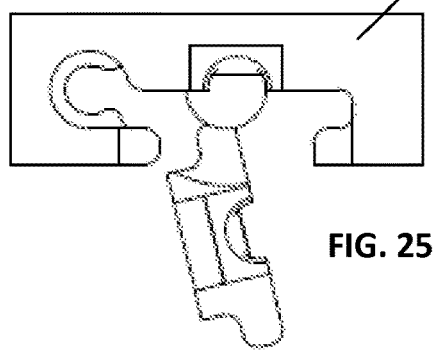
FIG. 25 shows a top view of the pinch valve of FIG. 17, with the insert ready to be removed from the holder.

To remove the insert 244 from the holder 246, the insert 244 can be placed in the open position shown at FIGS. 19 and 20. Then, the insert 244 is moved in the direction of the arrow 264 shown at FIG. 19. Movement of the insert 244 is possible due to a groove 266 (shown at FIG. 19) defined by the holder 246 that allows passage of the button 249 when the insert 244 is moved from the open position to the position shown at FIGS. 23, 24, and 25, from which the insert 244 can be moved out of the holder 246 to a removed position.

Figure 26:
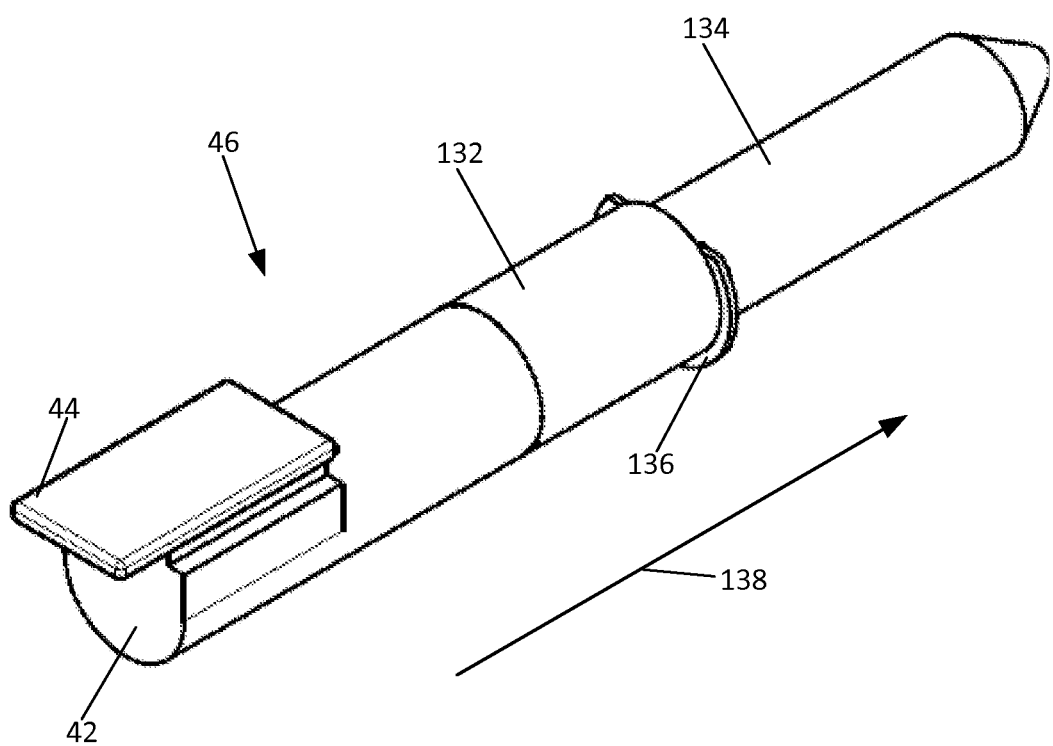
FIG. 26 shows an embodiment of a plunger assembly in accordance with the present disclosure.

FIG. 26 shows an embodiment of the plunger assembly 46 previously shown, at FIG. 2B, as part of the pinch valve 36 of FIG. 1. The plunger assembly 46 can be used with any of the pinch valve embodiments described in the present disclosure. The plunger assemblies 100, 164, and 203 shown at FIGS. 6C, 100, and 14C respectively, are similar to the plunger assembly 46. Other types of plunger assemblies can be used without departing from the scope of the present disclosure. For example, manually activated plunger assemblies, stepper motor plunger assemblies, or any other suitable electro-mechanical plunger assemblies can be used. The plunger assembly 46 comprises the plunger 42, the plunger tip 44, a retainer sleeve 132, a retaining ring 136, and a movable actuator 134. In this embodiment, the movable actuator 134 is configured to fit into a solenoid core (not shown) which, when energized, creates a magnetic field that pulls the movable actuator in the direction of the arrow 138.

Figure 27:
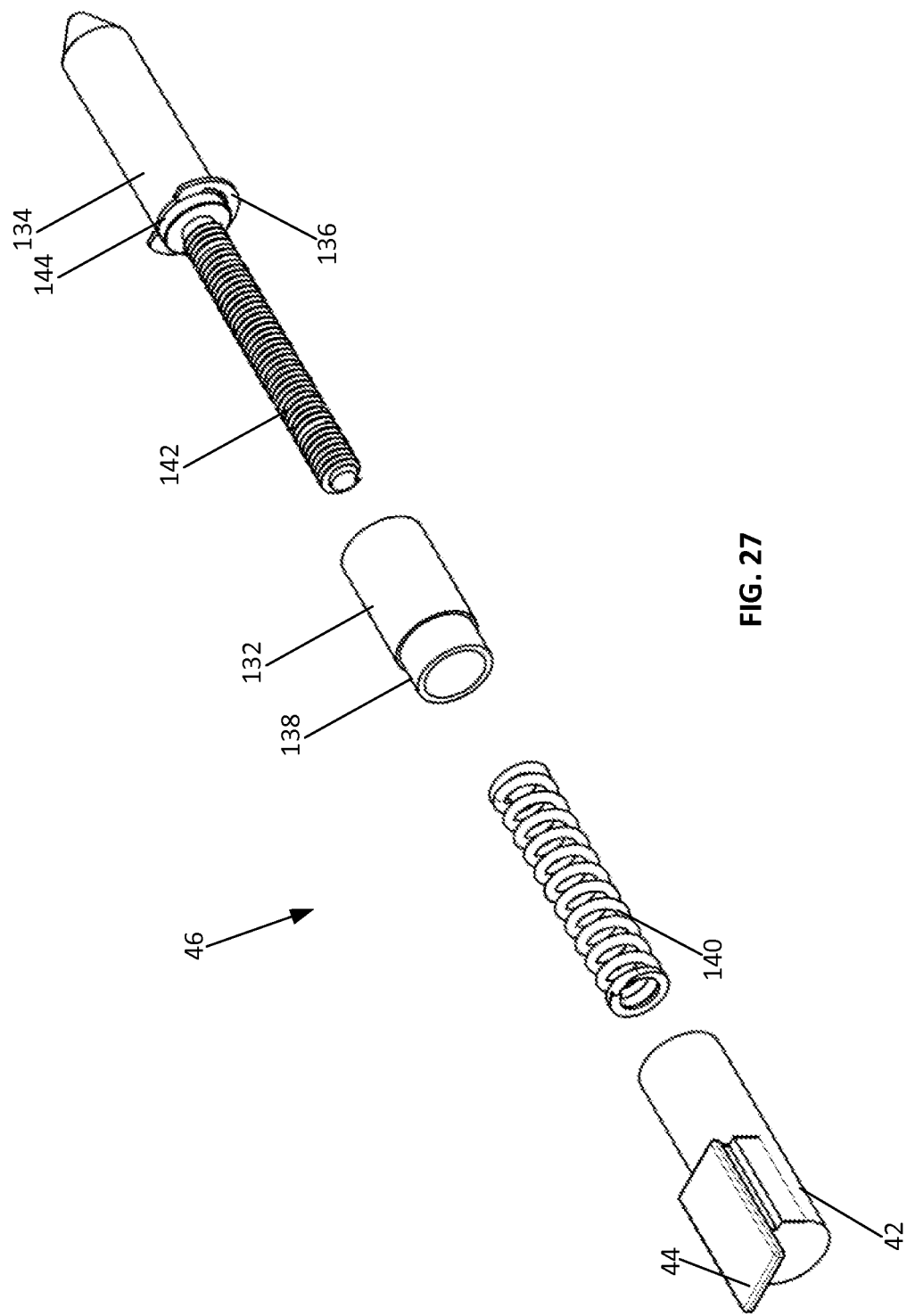
FIG. 27 shows an exploded view of the plunger assembly of FIG. 26.

FIG. 27 shows an exploded view of the plunger assembly 46 of FIG. 26. The exploded view of FIG. 27 shows a plunger 42 with a plunger tip 44, a helical spring 140, a sleeve 132 that defines an insert portion 138, which is configured for insertion into the plunger 42. The exploded view of FIG. 27 further shows a threaded stud 142 connected to an actuator 134. The actuator 134 defines a groove 144 into which a retainer ring 136 is inserted. In the assembled configuration, the retainer sleeve abuts against retainer ring 136.

Figure 28:
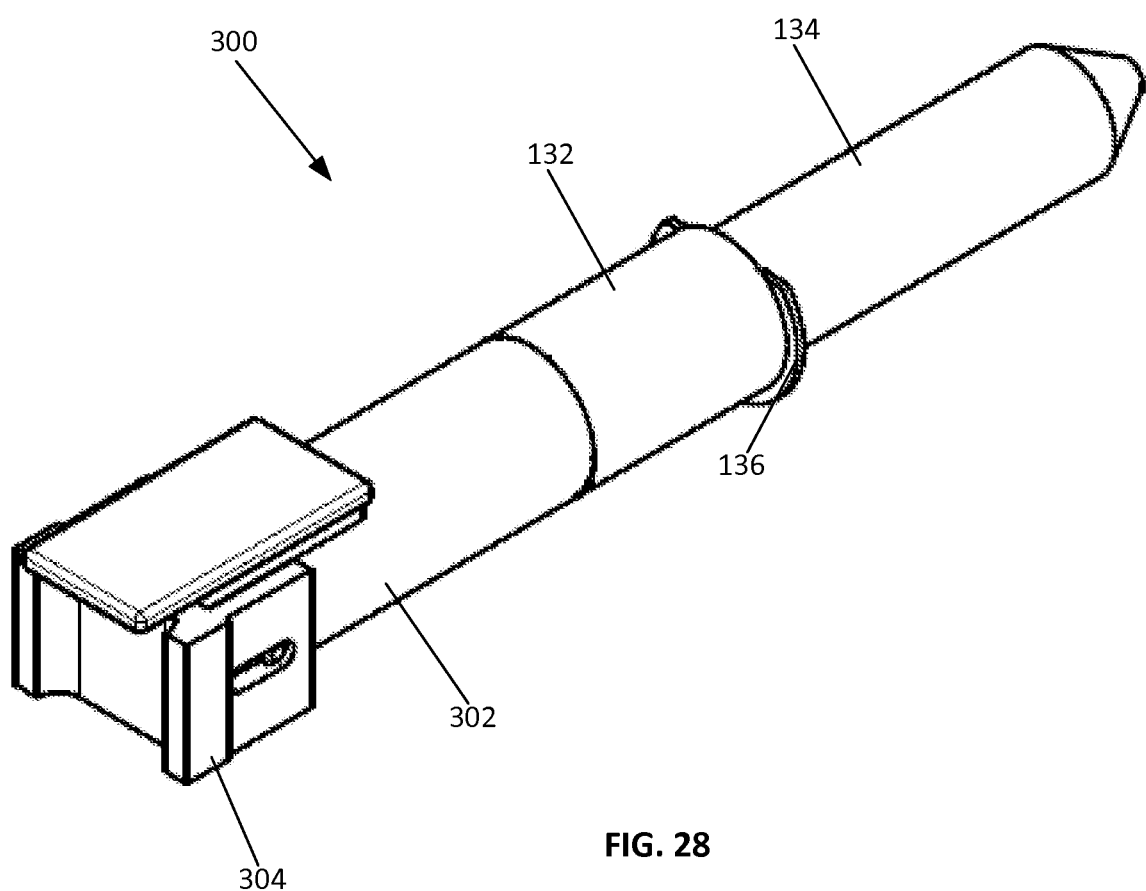
FIG. 28 shows another embodiment of a plunger assembly in accordance with the present disclosure.

FIG. 28 shows another embodiment of a plunger assembly 300 that can be part of the pinch valve of the present disclosure. The plunger assembly 300 comprises most of components of the plunger assembly of FIG. 27, except that the plunger 42 is replaced with a plunger 302, to which a false wall 304 component is secured. The false wall component 304 cooperates with the opposite walls portions, shown in the examples at FIG. 4E (reference numeral 61), FIG. 8E (reference numeral 127), FIG. 12E (reference numeral 194), FIG. 16E (reference numeral 240), and FIG. 22 (reference numeral 262), to abut the dispensing tube located in the respective pinch valve. That is, a given opposite wall portion by itself abuts the dispensing tube along a length of the tube equal to the height of the opposite wall portion. However, using a plunger assembly that has a false wall component such as false wall component 304, causes the dispensing tube to be abutted along a length equal to the height of the opposite wall section plus the height of the false wall component. Having such an extended abutment length causes the normally circular cross-section of the dispensing tube to be deformed—and to have a reduced cross-section area—along a greater length of the dispensing tube than when a plunger assembly without a false wall component is used. This can further diminish the flow of liquid from the dispensing tube and can improve dispensed liquid volume accuracy.

Figure 29:
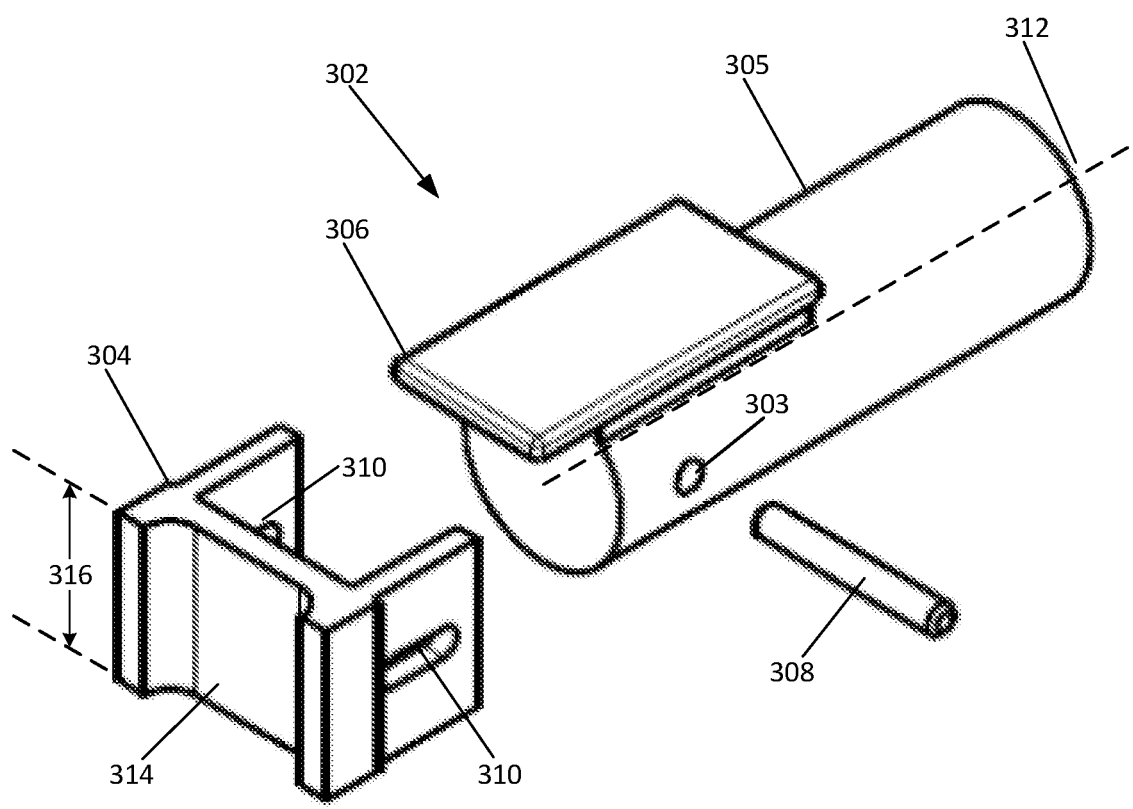
FIG. 29 shows an exploded view of the plunger portion of the plunger assembly of FIG. 28.

FIG. 29 shows an exploded view of the plunger 302 of FIG. 28. In this embodiment the plunger 302 defines an aperture 303 and includes a body 305, the false wall component 304, a plunger tip 306, and a pin 308. The false wall component 304 defines a pair of opposite grooves 310. The pin 308 is dimensioned to fit through the grooves 310 and through the aperture 303 to secure the false wall component 304 to the body 305. When secured to the body 305, the false wall component 304 can be moved back and forth with respect to the body 305, along the axis shown at 312. The false wall component 304 has false wall portion 314 that is for abutting a dispensing tube. The false wall portion 314 has a height 316.

Figure 30:
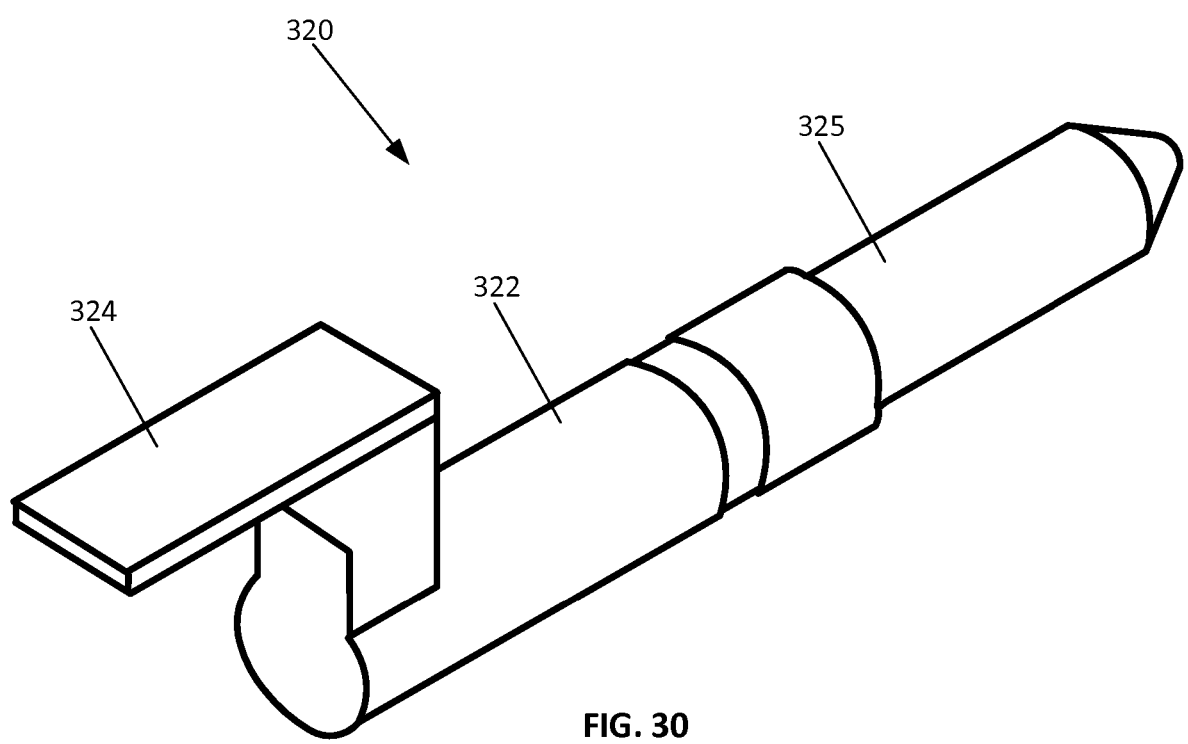
FIG. 30 shows another embodiment of a plunger assembly in accordance with the present disclosure.

In some embodiments of the plunger assembly, the plunger can have an extended tip. FIG. 30 shows such a plunger assembly 320, which has a plunger 322, with an extended plunger tip 324. Also shown is a movable actuator 325.

Figure 31:
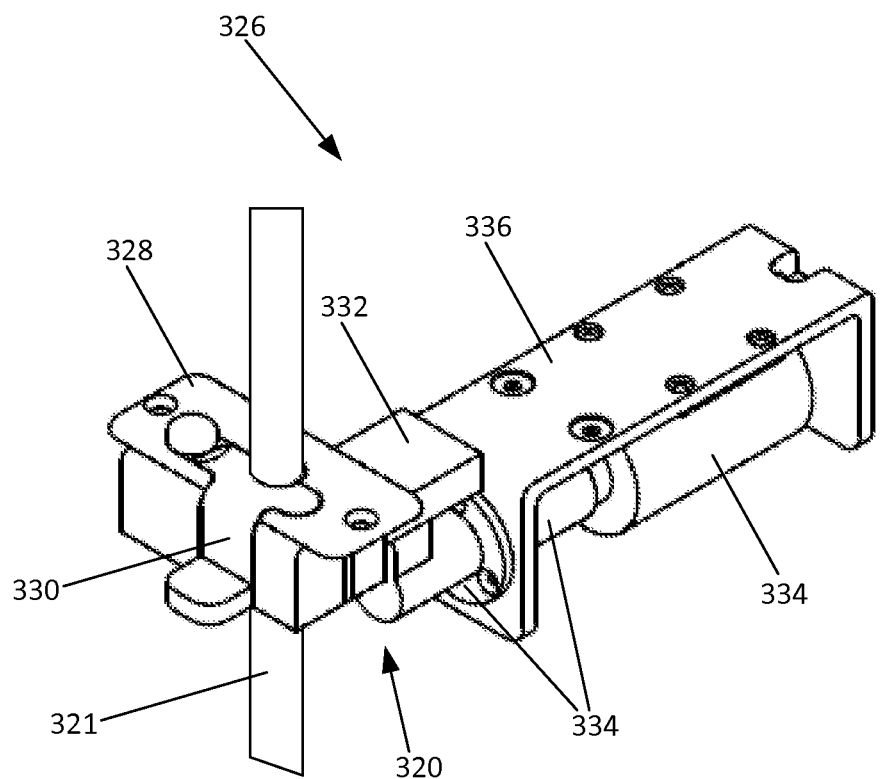
FIG. 31 shows another embodiment of a pinch valve of the present disclosure with the plunger assembly of FIG. 30.
Figure 32:
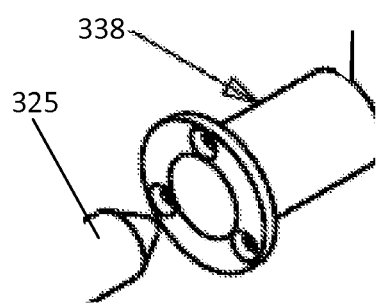
FIG. 32 shows a bushing used to align the plunger of FIG. 30 with a solenoid.

Plunger assemblies with extended plunger tips, such as shown at FIG. 30, can be used in pinch valves provided with a plunger cover. FIG. 31 shows such a pinch valve 326, which comprises a holder 328, an insert 330, and the plunger assembly 320. The holder 328 defines a plunger tip cover 332. FIG. 31 also shows a dispensing tube 321 and a solenoid 334, attached to a bracket 336. The top portion of the dispensing tube connects to a container (not shown) containing a liquid to be dispensed. When the pinch valve 326 is in an open configuration, liquid is dispensed out of the bottom of the dispensing tube 321. The holder 328 and the bracket 336 can be secured to a liquid dispensing machine through any suitable means such as, for example, screws, bolts, etc. The plunger assembly can include a bushing 338, which is secured to the bracket 336. The bushing allows for precise alignment of the movable actuator 325 (FIG. 30) of the plunger assembly with the solenoid 334. Such alignment allows for greater pull back of the movable actuator upon energizing the solenoid. FIG. 32 shows a perspective view of the bushing 338 and a partial view of the movable actuator 325.

Figure 33:
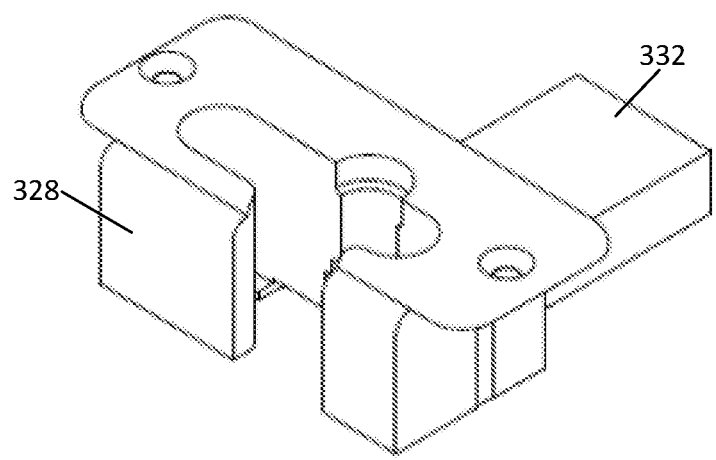
FIG. 33 shows a top perspective view of holder of the pinch valve of FIG. 31.

FIG. 32 shows a top, front perspective view of the holder 328, which comprises the plunger tip cover 332. FIG. 32 shows a side view of the holder 328, with the plunger tip cover 332. FIG. 33 shows a bottom view of the holder 328, with the plunger tip cover 332. The plunger tip cover 332 defines a recess 335, within which the plunger tip 324 (FIG. 30) can move.

Figure 34:
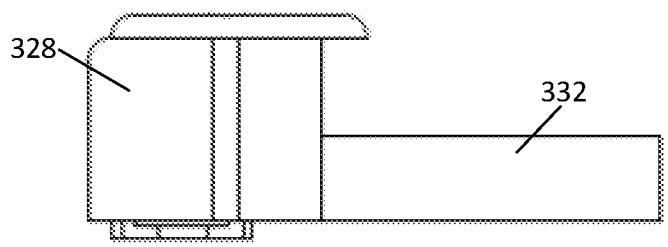
FIG. 34 shows a side view of holder of the pinch valve of FIG. 31.

FIG. 34 shows a side view of holder of the pinch valve of FIG. 31.

Figure 35:
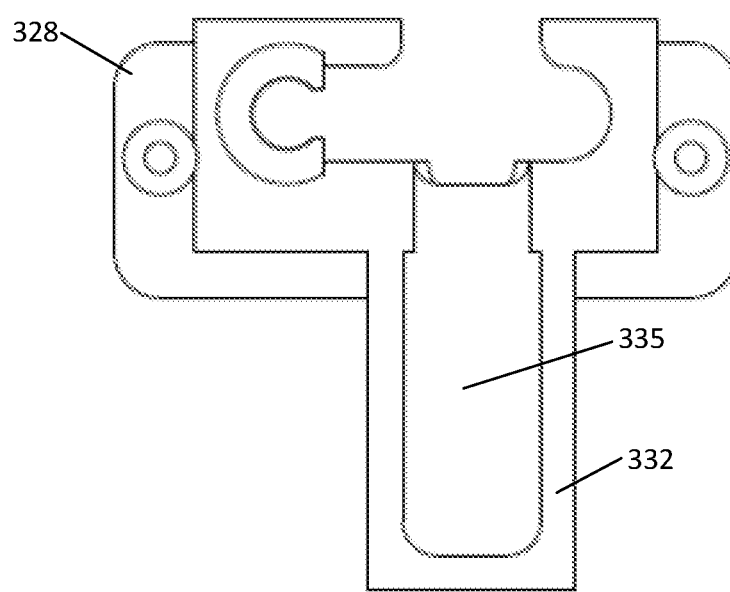
FIG. 35 shows a bottom view of holder of the pinch valve of FIG. 31.

FIG. 35 shows a bottom view of holder of the pinch valve of FIG. 31.

Although the pinch valve embodiments described above used either a shelf defined in the holder to hold the insert in the holder in the installed position, or an interference fit to hold the insert in the holder in the installed position, any other suitable type of fit can be used. For example, the holder and the insert can held together, in the installed position, using a ball detent mechanism where a small ball bearing secured on one of the holder and insert is aligned, in the installed position, with a corresponding indentation on the other of the holder and the insert (the ball bearing is biased away from the object—the holder or the insert—to which it is secured). In another example, the insert and the holder can be held together, in the installed position, through a magnet assembly formed in the insert an holder (e.g., a small magnet in the holder can align with a magnetic material in the insert when the insert is in the installed position). In yet another example, the insert can have tapered outer walls and the holder can have tapered inner walls angled to abut the tapered outer walls to the insert when the insert is in the installed position.

Although, in some of the embodiments, pivoting of the insert from the intermediary position to the open position is enabled by a post defined on a bracket cooperating with an aperture defined in the insert, or by a button sitting in a button housing, any other suitable mechanism that allows the insert to be pivoted from the intermediary position to the open position is also within the scope of the present disclosure. That is, any insert and holder pair that include complementary pivoting features that allow the insert to be pivoted with respect to the holder from the intermediary position to the open position is within the scope of the present disclosure, and, any insert and other part (e.g., a bracket) that include complementary pivoting features that allow the insert to be pivoted with respect to the other part from the intermediary position to the open position is within the scope of the present disclosure.

The insert and the holder of the pinch valve can be made of any suitable material such as, for example, acetal, high-density polyethylene, etc.

As described above, the present description relates to a pinch valve for dispensing liquids. The pinch valve comprises a holder and an insert that fits in the holder. The insert, the holder, or both, define an aperture in which a dispensing tube can be installed. Advantageously, the insert, the holder, or both, also define a throttle region along which dispensing tube is deformed and has a reduced cross-section. When the pinch valve is in an open state, the flow of liquid through the dispensing tube is reduced compared to what it would be if the pinch valve did not have a throttle region. This reduced flow of liquid, caused by the throttle region, allows for greater dispensing accuracy with respect to the volume of liquid dispensed. As a further advantage, the insert of the pinch valve of the present disclosure can be easily removed from the holder to allow for quick and easy cleaning.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A pinch valve comprising:
   a holder defining a recess; and
   an insert shaped to fit in the recess of the holder, the insert having an inner wall portion, the insert and the holder being structured for the insert to be moved, in a single movement, along an axis, from an installed position where the holder holds the insert, to a removed position where the insert is unconnected to the holder, the holder and the insert configured to receive a dispensing tube; and
   a plunger assembly configured to move, when the insert is in the installed position, from a pinch position where the plunger assembly pushes the dispensing tube against the inner wall portion of the insert to collapse the dispensing tube onto itself to prevent liquid from flowing through the dispensing tube, to a flow position where the plunger assembly is retracted from the inner wall portion,
   wherein the single movement is in a first direction along the axis, the pinch valve further comprising a bracket having a mating feature, the insert defining a complementary mating feature, the insert, the holder, and the bracket configured for the insert to be moved along a second direction, opposite the first direction, from the installed position to an intermediary position where the mating feature of the bracket and the complementary mating feature of the insert engage each other and define a pivot axis about which the insert can pivot to an open position, wherein the removed position, the intermediary position and the open position are distinct from each other.

2. The pinch valve of claim 1 wherein the holder has an opposite wall portion that is opposite to the inner wall portion of the insert, the inner wall portion and the opposite wall portion defining a throttle portion of the pinch valve, the throttle portion configured to receive the dispensing tube for a liquid, the throttle portion is configured to throttle a flow of liquid through the dispensing tube upon the plunger assembly being in the flow position.

3. The pinch valve of claim 2 wherein the plunger assembly includes a false wall component to abut the dispensing tube when the plunger assembly is in the flow position to diminish the flow of liquid from the dispensing tube.

4. The pinch valve of claim 2 wherein the pinch valve further comprises a bracket assembly, a solenoid secured to the bracket assembly, and a bushing secured to the bracket assembly, the plunger assembly being installed in the bushing and traversing the bushing, the bushing to maintain an alignment of the plunger assembly with the solenoid.

5. A pinch valve comprising:
   a holder defining a recess; and
   an insert shaped to fit in the recess of the holder, the insert having an inner wall portion, the insert and the holder being structured for the insert to be moved, in a single movement, along an axis, from an installed position where the holder holds the insert, to a removed position where the insert is unconnected to the holder, the holder and the insert configured to receive a dispensing tube and to cooperate, when in the installed position, with a plunger assembly biased to push the dispensing tube against the inner wall portion of the insert to collapse the dispensing tube onto itself to prevent liquid from flowing through the dispensing tube, the pinch valve configured to be operable when the holder holds the insert in the installed position,
   wherein the single movement is in a first direction along the axis, the pinch valve further comprising a bracket having a mating feature, the insert defining a complementary mating feature, the insert, the holder, and the bracket configured for the insert to be moved along a second direction, opposite the first direction, from the installed position to an intermediary position where the mating feature of the bracket and the complementary mating feature of the insert engage each other and define a pivot axis about which the insert can pivot to an open position, wherein the removed position, the intermediary position and the open position are distinct from each other.

6. The pinch valve of claim 1, wherein the axis along which the insert can be moved from the installed position to the removed position is parallel to the pivot axis about which the insert can pivot from the intermediary position to the open position.

7. The pinch valve of claim 5, wherein the mating feature of the bracket is a post and the complementary mating feature of the insert is a hole defined by the insert.

8. The pinch valve of claim 5 wherein the insert has a tab configured for manipulation by a user.

9. The pinch valve of claim 5 wherein the holder and the insert are dimensioned to interfere with each other when the insert is in the installed position.

10. The pinch valve of claim 5 wherein:
the holder defines a shelf portion that is tapered; and
the insert defines a recessed perimeter region that sits on the shelf portion when the insert is in the installed position.

11. The pinch valve of claim 5 wherein the insert and the holder are configured to be magnetically secured to each other when the insert is in the installed position.

12. The pinch valve of claim 5 further comprising a ball detent mechanism configured to secure the insert to the holder when the insert is in the installed position.

13. The pinch valve of claim 5 wherein the axis is a vertical axis and the insert and the holder are further configured for the insert to be moved upwardly along the vertical axis from the installed position to the removed position.

14. The pinch valve of claim 5 wherein the holder has an opposite wall portion that is opposite to the inner wall portion of the insert, the inner wall portion and the opposite wall portion defining a throttle portion of the pinch valve, the throttle portion to receive the dispensing tube for a liquid, the dispensing tube having a diameter smaller than a width of the throttle portion, the throttle portion to throttle a flow of liquid through the dispensing tube upon the plunger assembly being moved from a pinch position to a flow position.

15. A pinch valve comprising:
a holder defining a recess; and
an insert shaped to fit in the recess of the holder, the insert having an inner wall portion, the insert and the holder being structured for the insert to be moved, in a single movement, along an axis, from an installed position where the holder holds the insert without any fastener, to a removed position where the insert is unconnected to the holder, the holder and the insert configured to receive a dispensing tube and to cooperate, when in the installed position, with a plunger assembly biased to push the dispensing tube against the inner wall portion of the insert to collapse the dispensing tube onto itself to prevent liquid from flowing through the dispensing tube, the pinch valve configured to be operable when the holder holds the insert in the installed position, wherein:
the single movement is in a first direction along the axis;
the insert and the holder are configured for the insert to be moved along a second direction, opposite the first direction, from the installed position to an intermediary position; and
the insert defines a pivoting feature and the holder defines a complementary pivoting feature, the pivoting feature of the insert being configured to engage the complementary pivoting feature of the holder when the insert is in the intermediary position, the pivoting feature of the insert and the complementary pivoting feature of the holder being configured to allow the insert to be pivoted from the intermediary position to an open position, wherein the removed position, the intermediary position and the open position are distinct from each other.

16. The pinch valve of claim 15 wherein the pivoting feature of the insert is a button and the complementary pivoting feature of the holder is a button housing.

* * * * *